(12) United States Patent
Agano

(10) Patent No.: US 6,573,525 B1
(45) Date of Patent: Jun. 3, 2003

(54) METHOD AND APPARATUS FOR RECORDING AND READING OUT IMAGES

(75) Inventor: Toshitaka Agano, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/651,072

(22) Filed: Aug. 30, 2000

(30) Foreign Application Priority Data

Aug. 30, 1999 (JP) .......................................... 11-242874

(51) Int. Cl.[7] .................................................. G21K 4/00
(52) U.S. Cl. ....................................... 250/580; 250/311
(58) Field of Search ............................... 250/580, 311; 359/566

(56) References Cited

U.S. PATENT DOCUMENTS

| | | | |
|---|---|---|---|
| 4,788,426 A | * 11/1988 | Kuehnle ................... | 250/327.2 |
| 4,803,359 A | 2/1989 | Hosoi et al. ............. | 250/327.2 |
| 5,187,369 A | 2/1993 | Kingsley et al. ........ | 250/370.11 |
| 5,187,496 A | * 2/1993 | Yu ........................... | 346/135.1 |
| 5,268,569 A | 12/1993 | Nelson et al. ............. | 250/214 |
| 5,534,702 A | 7/1996 | Trutna, Jr. et al. | |
| 5,675,437 A | * 10/1997 | Hart et al. .................. | 359/566 |
| 5,794,023 A | * 8/1998 | Hobbs et al. ................ | 359/565 |
| 5,874,744 A | 2/1999 | Goodman et al. | |
| 5,886,354 A | 3/1999 | Leblans | |
| 5,904,781 A | * 5/1999 | Goodman et al. .......... | 118/726 |
| 5,946,450 A | * 8/1999 | Ebner et al. ................ | 395/109 |
| 6,123,877 A | * 9/2000 | Clabburn | |
| 6,229,877 B1 | * 5/2001 | Agano ........................ | 378/154 |

FOREIGN PATENT DOCUMENTS

| | | | |
|---|---|---|---|
| EP | 0 989 730 | 3/2000 | ............. H04N/1/00 |
| JP | 59-211263 | 11/1984 | ........... H01L/27/14 |
| JP | 1-216290 | 8/1989 | ............. G01T/1/24 |
| JP | 2-164067 | 6/1990 | ......... H01L/27/146 |
| JP | 10-48753 | 2/1998 | |
| JP | 10-232824 | 9/1998 | ........... G06F/12/06 |
| JP | 10-243379 | 9/1998 | ............ H04N/7/18 |
| JP | 11-87922 | 3/1999 | ............ H05K/3/46 |
| JP | 11-87923 | 3/1999 | ............ H05K/3/46 |
| JP | 11-89553 | 4/1999 | ............ C12M/1/00 |
| JP | 11-134599 | 5/1999 | ............ G08G/1/13 |
| JP | 2000-132355 | 5/2000 | ............. G06F/3/12 |
| JP | 2000-132356 | 5/2000 | ............. G06F/3/12 |
| WO | 92/06501 | 4/1992 | ........... H01L/27/14 |

OTHER PUBLICATIONS

Antonuk, L.E. et al., "Signal, noise and readout considerations in the development of amorphous silicon photodiode arrays for radiotherapy and diagnostic x-ray imaging" SPIE vol. 1443 Medical Imaging V: Image Physics (1991) p. 108–119.

Qureshi, S. et al., "Material Parameters in Thick Hydrogenated Amorphous Silicon Radiation Detectors" Lawrence Berkeley Laboratory, University of California, Berkeley, CA.

Naruse, Yujiro et al., "Metal/Amorphous Silicon Multilayer Radiation Detectors", IEEE Transactions on Nuclear Science, vol. 36, No. 2, Apr. 1989, p. 1347–1352.

Patent Abstract of Japan 02–164067 Jun. 25, 1990.
Patent Abstract of Japan 01–216290 Aug. 30, 1989.

* cited by examiner

Primary Examiner—Constatine Hannaher
Assistant Examiner—Otilia Gabor
(74) Attorney, Agent, or Firm—Sughrue Mion, PLLC

(57) ABSTRACT

An electromagnetic wave source, which produces a recording electromagnetic wave, is located on one side of an object. A two-dimensional image read-out device is located on the other side of the object. The two-dimensional image read-out device comprises a charge accumulating section for accumulating latent image charges, which carry image information. An anisotropic fluorescent material screen is located between the object and the two-dimensional image read-out device, and an operation for recording and reading out an image of an object is performed in this state. Problems with regard to deterioration of image sharpness are thus capable of being reduced.

22 Claims, 11 Drawing Sheets

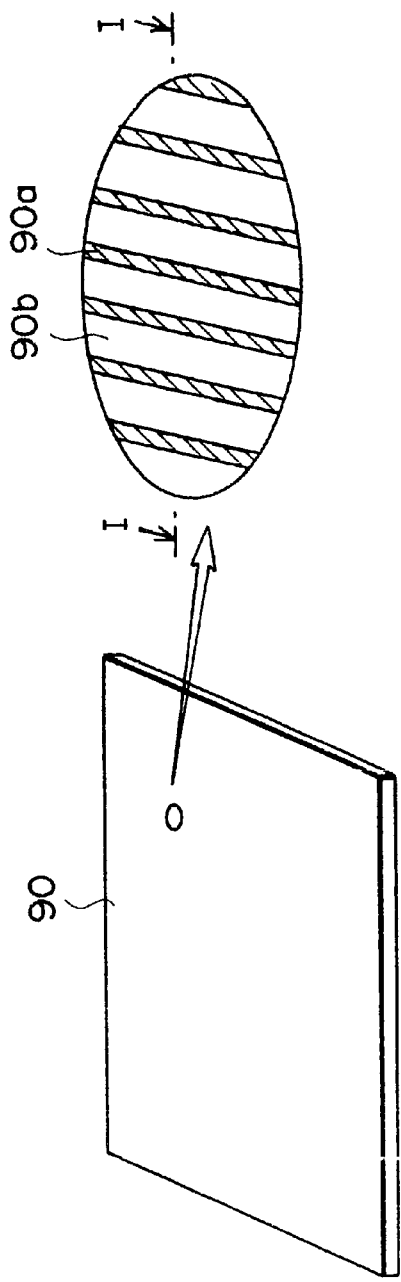
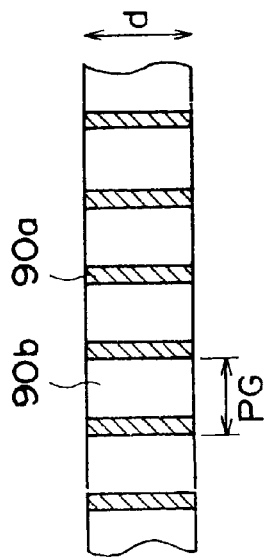
FIG. 2A  FIG. 2B  FIG. 2C

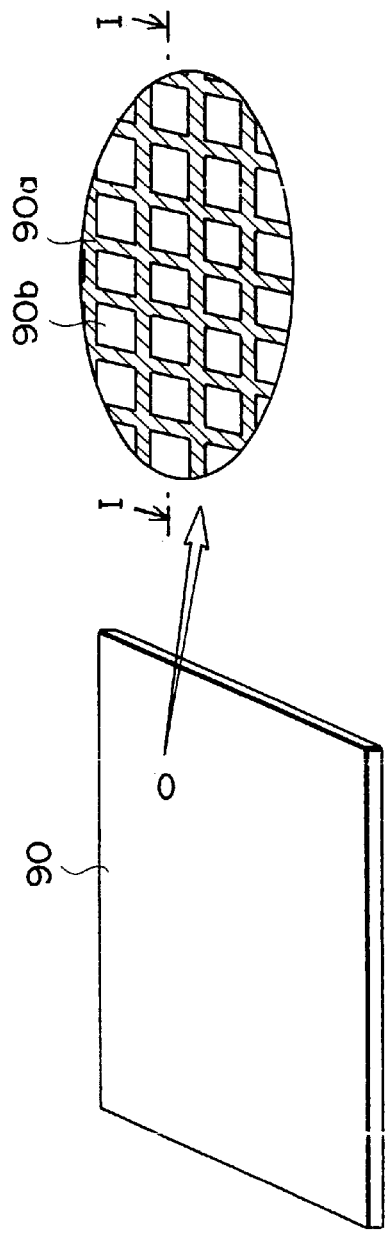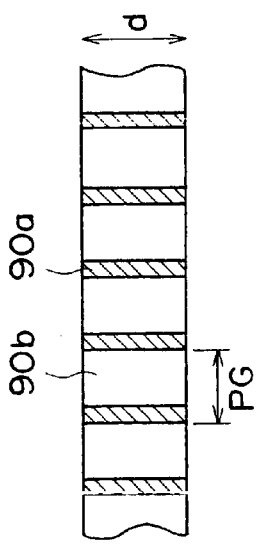
FIG. 5A  FIG. 5B  FIG. 5C

FIG. 6A
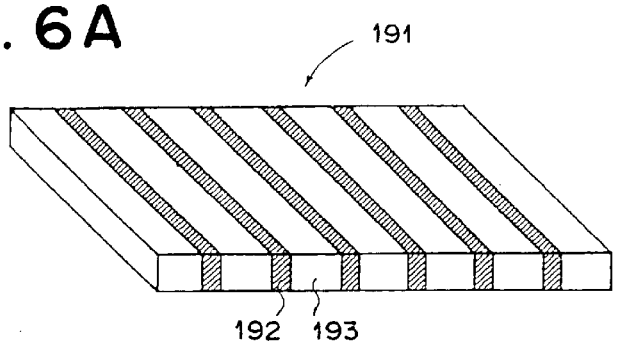
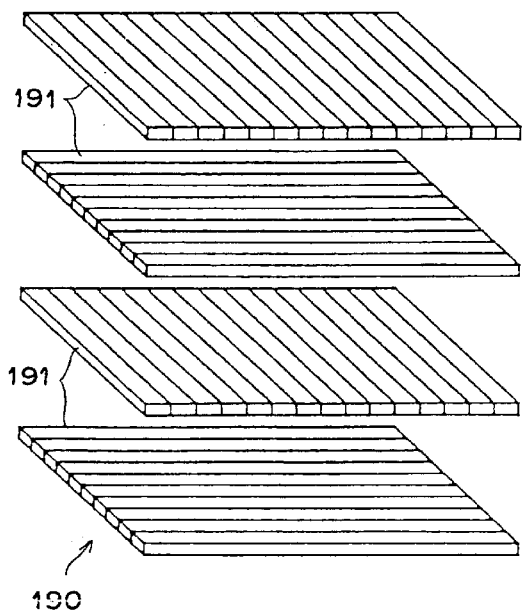
FIG. 6B
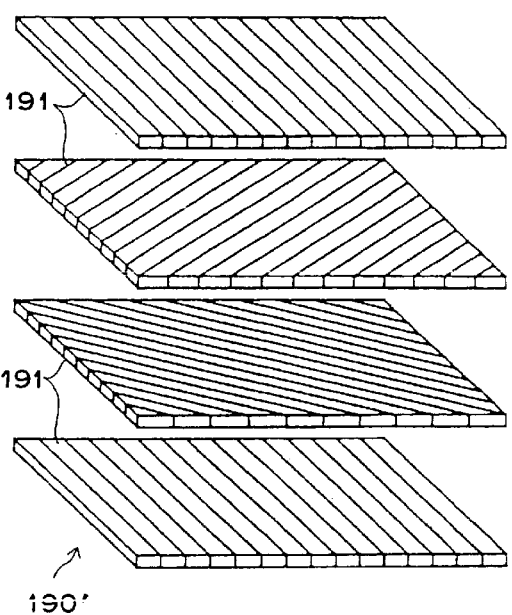
FIG. 6C

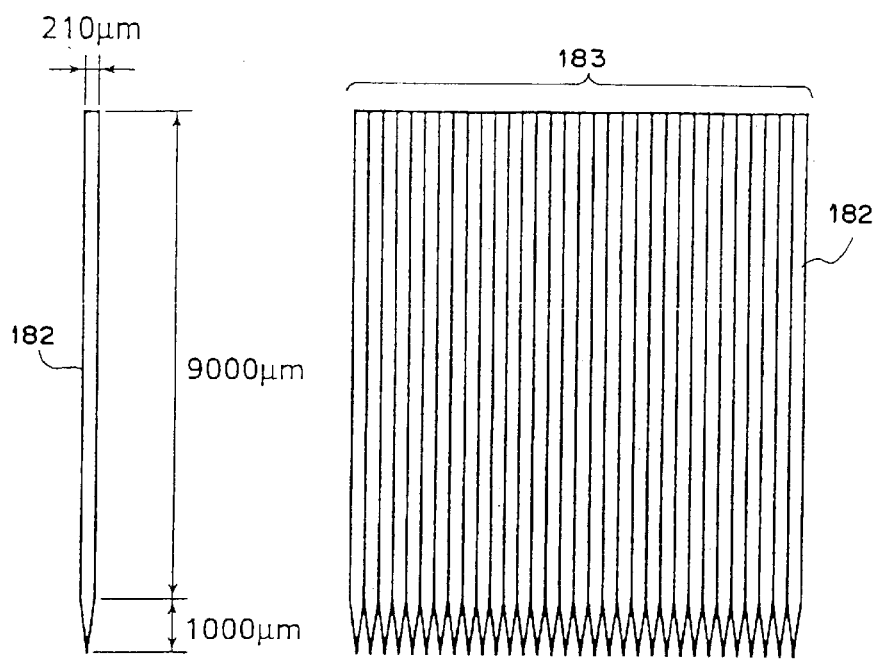
F I G. 8A    F I G. 8B
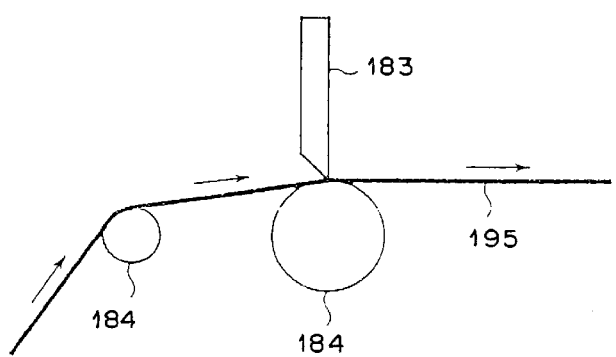
F I G. 8C

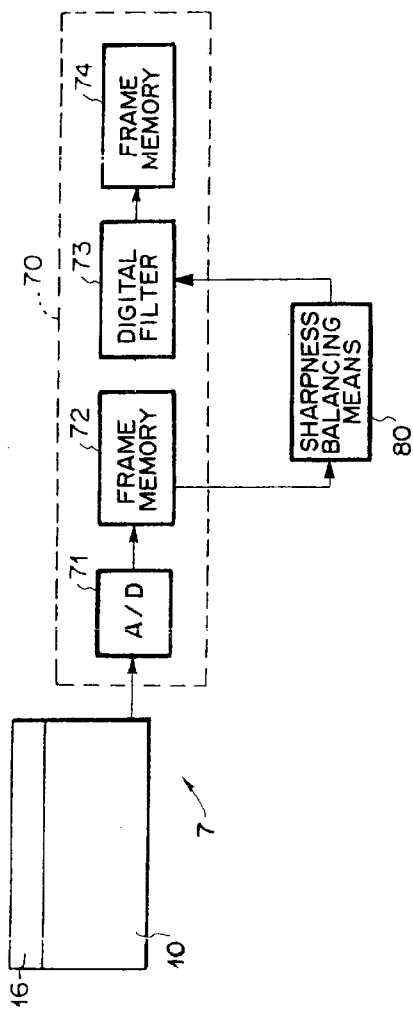
FIG. 11A
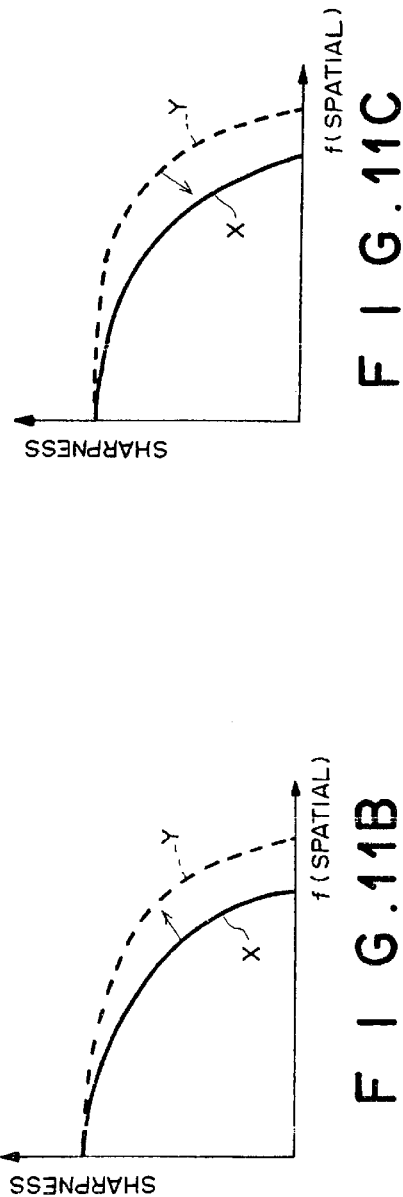
FIG. 11B
FIG. 11C

METHOD AND APPARATUS FOR RECORDING AND READING OUT IMAGES

BACKGROUND OF THE INVENTION

1. Field of the Invention

This invention relates to a method and apparatus for recording and reading out images, wherein an image is recorded by use of an anisotropic fluorescent material screen.

2. Description of the Related Art

Apparatuses utilizing two-dimensional image read-out means, e.g. facsimile apparatuses, copying machines, and radiation image sensors, have heretofore been known.

For example, in the fields of medical radiation image sensors, and the like, methods and apparatuses for recording and reading out radiation image information, wherein two-dimensional image read-out means is utilized, have heretofore been proposed. With the proposed methods and apparatuses for recording and reading out radiation image information, such that a radiation dose delivered to an object during a medical radiation image recording operation may be kept small, and such that the image quality of an image and its capability of serving as an effective tool in, particularly, the efficient and accurate diagnosis of an illness may be enhanced, a solid-state radiation detector (an electrostatic recording material), which is provided with a photo-conductive material (layer) sensitive to radiation, e.g. X-rays, such as a selenium plate, is employed as the two-dimensional image read-out means. The solid-state radiation detector is exposed to radiation, such as X-rays, carrying radiation image information, and electric charges in an amount proportional to the radiation dose delivered to the solid-state radiation detector are accumulated as latent image charges at a charge accumulating section in the solid-state radiation detector. In this manner, the radiation image information is recorded as an electrostatic latent image at the charge accumulating section. Thereafter, the solid-state radiation detector, in which the radiation image information has been recorded, is scanned with a laser beam or a light beam radiated out from a line light source, and the radiation image information is thereby read out from the solid-state radiation detector.

As the solid-state radiation detectors utilized as the two-dimensional image read-out means in the aforesaid methods and apparatuses for recording and reading out radiation image information, various types of solid-state radiation detectors have heretofore been proposed. For example, from the aspect of a charge forming process for generating the latent image charges, which carry image information, in the solid-state radiation detector, the solid-state radiation detectors may be classified into photo conversion types of solid-state radiation detectors, direct conversion types of solid-state radiation detectors, and improved direct conversion types of solid-state radiation detectors which belong to the category of the direct conversion types of solid-state radiation detectors and in which the latent image charges are read out through scanning with reading light. Also, from the aspect of a charge reading process for acquiring an image signal proportional to the amount of the latent image charges accumulated at the charge accumulating section, the solid-state radiation detectors may be classified into thin-film transistor (TFT) reading types of solid-state radiation detectors and photo reading types of solid-state radiation detectors.

With the TFT reading types of solid-state radiation detectors, TFT's are operated successively in order to convert the latent image charges, which are accumulated at the charge accumulating sections, into a radiation image signal, and the radiation image signal is fed out. With the photo reading types of solid-state radiation detectors, a reading electromagnetic wave (ordinarily, visible light is employed as the reading electromagnetic wave) is irradiated to the solid-state radiation detectors in order to convert the latent image charges, which are accumulated at the charge accumulating section, into an image signal, and the image signal is fed out.

With the photo conversion types of solid-state radiation detectors, radiation is converted into light, and thereafter electric charges are generated with the light. For example, the photo conversion types of solid-state radiation detectors comprise two-dimensional image read-out means (i.e., solid-state radiation detecting means) and a fluorescent material (i.e., a scintillator) overlaid upon the two-dimensional image read-out means. The two-dimensional image read-out means comprises an insulating substrate and a plurality of photoelectric conversion devices (each having a charge accumulating section for accumulating electric charges to be detected), which are arrayed in a two-dimensional pattern on the insulating substrate. When the fluorescent material is exposed to radiation carrying image information, the fluorescent material produces visible light carrying the image information. The photo conversion types of solid-state radiation detectors are described in, for example, Japanese Unexamined Patent Publication Nos. 59(1984)-211263 and 2(1990)-164067, PCT International Publication No. WO92/06501, and "Signal, Noise, and Read Out Considerations in the Development of Amorphous Silicon Photodiode Arrays for Radiotherapy and Diagnostic X-ray Imaging," L. E. Antonuk et al., University of Michigan, R. A. Street Xerox, PARC, SPIE Vol. 1443, Medical Imaging V; Image Physics (1991), pp. 108–119. The two-dimensional image read-out means employed in the photo conversion types of solid-state radiation detectors utilizes the TFT reading type of solid-state radiation detecting means. The two-dimensional image read-out means detects the fluorescence produced by the fluorescent material and accumulates the latent image charges, which carry the image information, at the charge accumulating sections of the photoelectric conversion devices. Also, the TFT's, each of which is connected to one of the photoelectric conversion devices, are operated successively, the latent image charges accumulated at the charge accumulating sections are thereby converted into a radiation image signal, and the radiation image signal is fed out.

With the direct conversion types of solid-state radiation detectors, radiation is irradiated to a photo-conductive layer, and electric charges are generated directly in the photo-conductive layer. For example, the direct conversion types of solid-state radiation detectors comprise a photo-conductive layer, which exhibits electrical conductivity when it is exposed to recording radiation, and two-dimensional image read-out means. The two-dimensional image read-out means is constituted of a plurality of charge collecting electrodes, which are arrayed in two-dimensional directions and collect electric charges generated in the photo-conductive layer, and capacitors, each of which acts as a charge accumulating section and is connected to one of the charge collecting electrodes. The electric charges having been collected by each of the charge collecting electrodes are accumulated at the corresponding capacitor as the latent image charges carrying the image information. The direct conversion types of solid-state radiation detectors are described in, for example, (i) "Material Parameters in Thick Hydrogenated Amorphous Silicon Radiation Detectors," Lawrence Berkeley Laboratory, University of California, Berkeley, Calif. 94720 Xerox Parc. Palo Alto. Calif. 94304; (ii) "Metal/Amorphous Silicon Multilayer Radiation Detectors, IEE TRANSACTIONS ON NUCLEAR SCIENCE, Vol. 36, No. 2, April 1989; and (iii) Japanese Unexamined Patent Publication No. 1(1989)-216290. As in the photo conversion types of solid-state radiation detectors, the two-dimensional image read-out means employed in the direct conversion types of solid-state radiation detectors utilizes the TFT reading technique. Specifically, the TFT's are operated successively, the latent image charges having been accumulated at the capacitors are thereby converted into a radiation image signal, and the radiation image signal is fed out.

The improved direct conversion types of solid-state radiation detectors have been proposed by the applicant in Japanese Patent Application Nos. 10(1998)-232824 and 10(1998)-271374. In the improved direct conversion types of solid-state radiation detectors, latent image charges are read out through the scanning with reading light. The improved direct conversion types of solid-state radiation detectors comprise:

i) a first electrical conductor layer having permeability to recording radiation, ii) a recording photo-conductive layer, which exhibits electrical conductivity when it is exposed to the recording radiation having passed through the first electrical conductor layer, iii) a charge transporting layer, which acts approximately as an insulator with respect to electric charges having a polarity identical with the polarity of electric charges occurring in the first electrical conductor layer, and which acts approximately as a conductor with respect to electric charges having a polarity opposite to the polarity of the electric charges occurring in the first electrical conductor layer, iv) a reading photo-conductive layer, which exhibits electrical conductivity when it is exposed to a reading electromagnetic wave, and v) a second electrical conductor layer having permeability to the reading electromagnetic wave, the layers being overlaid in this order. In the improved direct conversion types of solid-state radiation detectors, latent image charges carrying image information are accumulated at a charge accumulating section, which is formed at an interface between the recording photo-conductive layer and the charge transporting layer. In the proposed improved direct conversion types of solid-state radiation detectors, the photo reading technique is employed for the acquisition of an image signal. The proposed improved direct conversion types of solid-state radiation detectors are not the ones which comprise a plurality of detecting devices distributed in two-dimensional directions. However, since the proposed improved direct conversion types of solid-state radiation detectors are scanned with reading light, which acts as a reading electromagnetic wave, the solid-state radiation detectors substantially act as the two-dimensional image read-out means.

Such that the sensitivity of the direct conversion types of solid-state radiation detectors and the improved direct conversion types of solid-state radiation detectors described above may be enhanced and images having good image quality may be obtained, i.e. such that the ratio of signal values, which are outputted from the solid-state radiation detectors, to the dose of radiation delivered to the solid-state radiation detectors may be enhanced, the applicant proposed the methods and apparatuses, wherein a fluorescent material screen having a high radiation absorption efficiency is located on the recording radiation irradiation side of the solid-state radiation detector, and an image recording and read-out operation is performed in this state. The methods and apparatuses utilizing the fluorescent material screen are proposed in, for example, Japanese Patent Application Nos. 10(1998)-232824 and 10(1998)-243379.

However, in cases where the fluorescent material screen is located in the manner described above and the image recording operation is performed in this state, the problems occur in that the light becomes blurred within the fluorescent material screen, the sharpness of the obtained image becomes low, and the image quality of the obtained image becomes bad.

SUMMARY OF THE INVENTION

The primary object of the present invention is to provide an image recording and read-out method wherein, in cases where an image recording and read-out operation is performed by utilizing a fluorescent material screen, problems with regard to deterioration of image sharpness are capable of being reduced.

Another object of the present invention is to provide an image recording and read-out method, wherein problems with regard to a moire phenomenon and unbalance between image sharpness in a main scanning direction and image sharpness in a sub-scanning direction, which problems may occur when the problems with regard to deterioration of image sharpness are reduced, are capable of being reduced.

The specific object of the present invention is to provide an apparatus for carrying out the image recording and read-out method.

The present invention provides a first image recording and read-out method, comprising the steps of:

i) locating an electromagnetic wave source, which produces a recording electromagnetic wave, on one side of an object, ii) locating two-dimensional image read-out means on the other side of the object, the two-dimensional image read-out means comprising a charge accumulating section for accumulating latent image charges, which carry image information, and iii) performing an operation for recording and reading out an image of the object, wherein an anisotropic fluorescent material screen is located between the object and the two-dimensional image read-out means, and the operation for recording and reading out the image of the object is performed in this state.

The anisotropic fluorescent material screen has a structure, in which an area filled with a fluorescent material is partitioned into a plurality of fine cells (fluorescent material-filled regions) by fluorescence reflecting partition wall members extending in the thickness direction of the screen. Specifically, the anisotropic fluorescent material screen may have a structure, in which the partition wall members and the fluorescent material-filled regions are arrayed alternately in a stripe-like form, and the fluorescent material-filled regions are thus arrayed to stand side by side in a one-dimensional direction. Alternatively, the anisotropic fluorescent material screen may have a structure, in which the fluorescent material-filled regions, i.e. the fine cells, partitioned from one another are distributed in two-dimensional directions. For example, the partition wall members may be arrayed in a checkered pattern.

In the latter case, plan shapes of the fluorescent material-filled regions, i.e., the cell shapes, as viewed from above the upper surface of the anisotropic fluorescent material screen, may be one of various shapes, such as square shapes and circular shapes.

By way of example, as the anisotropic fluorescent material screen, in which the fine cells are distributed in two-dimensional directions, one of the anisotropic fluorescent material screens described below may be employed.

Specifically, a first example is an anisotropic fluorescent material screen proposed by the applicant in Japanese Patent Application No. 2000-132356. The anisotropic fluorescent material screen comprises at least two striped fluorescent material layers, each of which is constituted of stripe-like partition walls for partitioning the anisotropic fluorescent material screen in a one-dimensional direction along a plane direction, and fluorescent material-filled regions partitioned by the stripe-like partition walls, the at least two striped fluorescent material layers being overlaid one upon the other such that the stripe-like partition walls of each of the striped fluorescent material layers intersect at an angle of approximately 90° (i.e., approximately perpendicularly) or approximately 60° with the stripe-like partition walls of an adjacent striped fluorescent material layer.

A second example is an anisotropic fluorescent material screen produced by a production process proposed by the applicant in Japanese Patent Application No. 2000-132355. The anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) solidifying the composition to obtain a striped fluorescent material film, which has partition walls arrayed so as to stand side by side in a one-dimensional direction, and e) overlaying a plurality of striped fluorescent material films, which have thus been obtained, such that the stripes of each of the striped fluorescent material films intersect with the stripes of an adjacent striped fluorescent material film (and preferably thereafter applying heat and a pressure to the striped fluorescent material films, which have thus been overlaid one upon another).

A third example is an anisotropic fluorescent material screen produced by a production process proposed by the applicant in Japanese Patent Application No. 2000-132355. The anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) applying the composition, which contains the a partition wall material dispersed therein, onto a surface of the fluorescent material film, e) solidifying the composition to obtain a striped fluorescent material film, which has partition walls arrayed so as to stand side by side in a one-dimensional direction and has a partition wall layer formed on one surface, f) overlaying a plurality of striped fluorescent material films, which have thus been obtained, such that the stripes of each of the striped fluorescent material films are parallel with the stripes of an adjacent striped fluorescent material film, (and preferably thereafter applying heat and a pressure to the striped fluorescent material films, which have thus been overlaid one upon another,) to obtain a laminate block, and g) slicing the laminate block along a lamination plane, in which the stripes appear.

The present invention also provides a second image recording and read-out method aiming at reducing a moire phenomenon occurring due to the provision of the anisotropic fluorescent material screen wherein, in cases where two-dimensional image read-out means, which is constituted of a plurality of linear electrodes arrayed in a stripe-like form, and an anisotropic fluorescent material screen, in which a direction of anisotropy is a one-dimensional direction alone, are utilized, the anisotropic fluorescent material screen is located such that no moire may occur in an array direction of the linear electrodes, along which the linear electrodes stand side by side. Specifically, the present invention also provides a second image recording and read-out method, comprising the steps of:

i) locating an electromagnetic wave source, which produces a recording electromagnetic wave, on one side of an object, ii) locating two-dimensional image read-out means on the other side of the object, the two-dimensional image read-out means comprising a charge accumulating section for accumulating latent image charges, which carry image information, iii) locating an anisotropic fluorescent material screen between the object and the two-dimensional image read-out means, and iv) performing an operation for recording and reading out an image of the object, wherein the two-dimensional image read-out means comprises a plurality of linear electrodes for acquiring an electric signal proportional to an amount of the latent image charges, the linear electrodes being arrayed so as to stand side by side in a stripe-like form, the anisotropic fluorescent material screen is a fluorescent material screen, in which a direction of anisotropy is a one-dimensional direction alone, and the anisotropic fluorescent material screen is located such that the direction of anisotropy is approximately normal to an array direction of the linear electrodes, along which the linear electrodes stand side by side.

The term "direction of anisotropy" as used herein means the array direction of the fluorescence reflecting partition wall members, along which the partition wall members stand side by side, in the anisotropic fluorescent material screen.

The present invention further provides a third image recording and read-out method aiming at reducing the moire phenomenon occurring due to the provision of the anisotropic fluorescent material screen, wherein moire components, which may be contained in an image signal detected with the two-dimensional image read-out means, are reduced or eliminated. Specifically, the present invention further provides a third image recording and read-out method, comprising the steps of:
  i) locating an electromagnetic wave source, which produces a recording electromagnetic wave, on one side of an object,
  ii) locating two-dimensional image read-out means on the other side of the object, the two-dimensional image read-out means comprising a charge accumulating section for accumulating latent image charges, which carry image information,
  iii) locating an anisotropic fluorescent material screen between the object and the two-dimensional image read-out means, and
  iv) performing an operation for recording and reading out an image of the object,
    wherein a difference between a spatial frequency of a read-out pitch (a sensor pitch) of an image signal detected with the two-dimensional image read-out means and a spatial frequency of an anisotropy pitch of the anisotropic fluorescent material screen is set at a value of at least 1 cycle/mm.

In the third image recording and read-out method in accordance with the present invention, signal components, which are contained in the image signal having been detected with the two-dimensional image read-out means and which carry a moire frequency occurring due to the anisotropic fluorescent material screen, should preferably be suppressed.

The term "read-out pitch of an image signal" as used herein means the read-out pitch PO, at which the image signal proportional to the amount of the latent image charges accumulated at the charge accumulating section is acquired. How the read-out pitch PO is defined varies for different constitutions of the two-dimensional image read-out means. For example, in cases where the improved direct conversion type of solid-state radiation detector is employed as the two-dimensional image read-out means, an array pitch PC of the linear electrodes of the solid-state radiation detector or a scanning pitch (sampling pitch) PS of the reading light is defined as the read-out pitch PO. In cases where the direct conversion type of solid-state radiation detector is employed as the two-dimensional image read-out means, an array pitch PD of the charge collecting electrodes of the solid-state radiation detector is defined as the read-out pitch PO. In cases where the photo conversion type of solid-state radiation detector is employed as the two-dimensional image read-out means, an array pitch PP of the photoelectric conversion devices of the solid-state radiation detector is defined as the read-out pitch PO.

The term "spatial frequency of a read-out pitch of an image signal" as used herein means the frequency represented by the formula of $fO=1/PO$, in which PO represents the read-out pitch. Also, the term "spatial frequency of an anisotropy pitch" as used herein means the frequency represented by the formula of $fG=1/PG$, in which PG represents the anisotropy pitch of the anisotropic fluorescent material screen, i.e. the array pitch of the partition wall members of the anisotropic fluorescent material screen. As described above, the read-out pitch PO varies for different constitutions of the two-dimensional image read-out means.

In cases where the anisotropy pitch PG and the read-out pitch PO are different from each other, even if uniform recording electromagnetic wave is irradiated to the two-dimensional image read-out means, a periodical streak-like pattern, i.e. a moire, occurs in the image due to a spatial phase difference. The term "moire frequency occurring due to an anisotropic fluorescent material screen" as used herein means the repetition frequency of the streak-like pattern in the moire phenomenon. Specifically, in cases where the improved direct conversion type of solid-state radiation detector is employed as the two-dimensional image read-out means, the term "moire frequency occurring due to an anisotropic fluorescent material screen" as used herein means the difference between a spatial frequency fC of the pitch of the linear electrodes of the solid-state radiation detector and the spatial frequency fG of the anisotropy pitch of the anisotropic fluorescent material screen, or the difference between a spatial frequency fS of the sampling pitch, at which the latent image charges are read with scanning in the longitudinal direction of each linear electrode, and the spatial frequency fG of the anisotropy pitch. In cases where the direct conversion type of solid-state radiation detector is employed as the two-dimensional image read-out means, the term "moire frequency occurring due to an anisotropic fluorescent material screen" as used herein means the difference between a spatial frequency fD of the charge collecting electrodes of the solid-state radiation detector, which spatial frequency is taken in the array direction of the partition wall members of the anisotropic fluorescent material screen, and the spatial frequency fG of the anisotropy pitch of the anisotropic fluorescent material screen. In cases where the photo conversion type of solid-state radiation detector is employed as the two-dimensional image read-out means, the term "moire frequency occurring due to an anisotropic fluorescent material screen" as used herein means the difference between a spatial frequency fP of the photoelectric conversion devices of the solid-state radiation detector, which spatial frequency is taken in the array direction of the partition wall members of the anisotropic fluorescent material screen, and the spatial frequency fG of the anisotropy pitch of the anisotropic fluorescent material screen. As described above, the read-out pitch PO varies for different constitutions of the two-dimensional image read-out means.

The present invention still further provides a fourth image recording and read-out method aiming at reducing the moire phenomenon occurring due to the provision of the anisotropic fluorescent material screen, wherein the read-out pitch of the two-dimensional image read-out means is set such that no moire component may occur. Specifically, the present invention still further provides a fourth image recording and read-out method, comprising the steps of:
  i) locating an electromagnetic wave source, which produces a recording electromagnetic wave, on one side of an object,
  ii) locating two-dimensional image read-out means on the other side of the object, the two-dimensional image read-out means comprising a charge accumulating section for accumulating latent image charges, which carry image information,
  iii) locating an anisotropic fluorescent material screen between the object and the two-dimensional image read-out means, and
  iv) performing an operation for recording and reading out an image of the object,
    wherein a spatial frequency of a read-out pitch of an image signal detected with the two-dimensional image read-out means is set at a value at least two times as high as a spatial frequency of an anisotropy pitch of the anisotropic fluorescent material screen.

In the fourth image recording and read-out method in accordance with the present invention, signal components, which are contained in the image signal having been detected with the two-dimensional image read-out means and which carry the spatial frequency of the anisotropy pitch of the anisotropic fluorescent material screen, should preferably be suppressed.

The present invention also provides a fifth image recording and read-out method aiming at reducing the problems occurring in that image sharpness in a main scanning direction and image sharpness in a sub-scanning direction become unbalanced due to the provision of the anisotropic fluorescent material screen. Specifically, the present invention also provides a fifth image recording and read-out method, comprising the steps of:

i) locating an electromagnetic wave source, which produces a recording electromagnetic wave, on one side of an object, ii) locating two-dimensional image read-out means on the other side of the object, the two-dimensional image read-out means comprising a charge accumulating section for accumulating latent image charges, which carry image information, iii) locating an anisotropic fluorescent material screen, in which a direction of anisotropy is a one-dimensional direction alone, between the object and the two-dimensional image read-out means, such that the direction of anisotropy in the anisotropic fluorescent material screen coincides with a main scanning direction or a sub-scanning direction in the two-dimensional image read-out means, and iv) performing an operation for recording and reading out an image of the object, wherein sharpness of an image signal, which has been detected with the two-dimensional image read-out means, with respect to the main scanning direction and sharpness of the image signal with respect to the sub-scanning direction are set to be approximately identical with each other.

The present invention further provides an apparatus for carrying out the first image recording and read-out method in accordance with the present invention. Specifically, the present invention further provides a first image recording and read-out apparatus, comprising two-dimensional image read-out means for receiving an incident recording electromagnetic wave and accumulating latent image charges, which carry image information, at a charge accumulating section, wherein the improvement comprises the provision of an anisotropic fluorescent material screen, which is located between an object and the two-dimensional image read-out means.

The two-dimensional image read-out means should preferably be a photo reading type of two-dimensional image read-out means operating such that, when the photo reading type of two-dimensional image read-out means is exposed to a reading electromagnetic wave, the photo reading type of two-dimensional image read-out means outputs an image signal of a level proportional to the amount of the latent image charges accumulated at the charge accumulating section. Particularly, in cases where the solid-state radiation detectors proposed by the applicant in, for example, Japanese Patent Application Nos. 10(1998)-232824, 10(1998)-271374, 11(1999)-87922, and 11(1999)-89553 are employed as the two-dimensional image read-out means, a high efficiency and a high resolution can be obtained.

The present invention still further provides an apparatus for carrying out the second image recording and read-out method in accordance with the present invention. Specifically, the present invention still further provides a second image recording and read-out apparatus, comprising:

i) an anisotropic fluorescent material screen, and ii) two-dimensional image read-out means for receiving a recording electromagnetic wave incident via the anisotropic fluorescent material screen and accumulating latent image charges, which carry image information, at a charge accumulating section, wherein the two-dimensional image read-out means comprises a plurality of linear electrodes for acquiring an electric signal proportional to an amount of the latent image charges, the linear electrodes being arrayed so as to stand side by side in a stripe-like form, the anisotropic fluorescent material screen is a fluorescent material screen, in which a direction of anisotropy is a one-dimensional direction alone, and the anisotropic fluorescent material screen is located such that the direction of anisotropy is approximately normal to an array direction of the linear electrodes, along which the linear electrodes stand side by side.

The present invention also provides an image recording and read-out apparatus, comprising:

i) an anisotropic fluorescent material screen, and ii) two-dimensional image read-out means for receiving a recording electromagnetic wave incident via the anisotropic fluorescent material screen and accumulating latent image charges, which carry image information, at a charge accumulating section, wherein the apparatus further comprises moire component reducing means for reducing moire components, which may be contained in an image signal detected with the two-dimensional image read-out means and which occur due to the anisotropic fluorescent material screen.

The term "reducing moire components" as used herein means that the moire components contained in the image signal having been detected with the two-dimensional image read-out means are reduced or eliminated, and that the image signal is acquired such that no moire component may occur.

Specifically, the present invention further provides a third image recording and read-out apparatus for carrying out the third image recording and read-out method in accordance with the present invention, wherein the moire component reducing means is means for operating such that a difference between a spatial frequency of a read-out pitch of the image signal detected with the two-dimensional image read-out means and a spatial frequency of an anisotropy pitch of the anisotropic fluorescent material screen is set at a value of at least 1 cycle/mm.

In the third image recording and read-out apparatus in accordance with the present invention, the moire component reducing means should preferably be provided with first image processing means for suppressing signal components, which are contained in the image signal having been detected with the two-dimensional image read-out means and which carry a moire frequency occurring due to the anisotropic fluorescent material screen.

The present invention still further provides a fourth image recording and read-out apparatus for carrying out the fourth image recording and read-out method in accordance with the present invention, wherein the moire component reducing means is means for operating such that a spatial frequency of a read-out pitch of the image signal detected with the two-dimensional image read-out means is set at a value at least two times as high as a spatial frequency of an anisotropy pitch of the anisotropic fluorescent material screen.

In the fourth image recording and read-out apparatus in accordance with the present invention, the moire component reducing means should preferably be provided with second image processing means for suppressing signal components, which are contained in the image signal having been detected with the two-dimensional image read-out means and which carry the spatial frequency of the anisotropy pitch of the anisotropic fluorescent material screen.

The present invention also provides an apparatus for carrying out the fifth image recording and read-out method in accordance with the present invention. Specifically, the present invention also further provides a fifth image recording and read-out apparatus, comprising:

i) an anisotropic fluorescent material screen, in which a direction of anisotropy is a one-dimensional direction alone, and ii) two-dimensional image read-out means for receiving a recording electromagnetic wave incident via the anisotropic fluorescent material screen and accumulating latent image charges, which carry image information, at a charge accumulating section, the anisotropic fluorescent material screen being located such that the direction of anisotropy in the anisotropic fluorescent material screen coincides with a main scanning direction or a sub-scanning direction in the two-dimensional image read-out means, wherein the apparatus further comprises sharpness balancing means for operating such that sharpness of an image signal, which has been detected with the two-dimensional image read-out means, with respect to the main scanning direction and sharpness of the image signal with respect to the sub-scanning direction are set to be approximately identical with each other.

In the fifth image recording and read-out method and the fifth image recording and read-out apparatus in accordance with the present invention, the sharpness of the image signal with respect to the main scanning direction and the sharpness of the image signal with respect to the sub-scanning direction are set to be approximately identical with each other. For such purposes, the sharpness with respect to a scanning direction, which is associated with a low sharpness, may be enhanced so as to become approximately identical with a high sharpness with respect to the other scanning direction, and the sharpness with respect to the two scanning directions may thereby be set to be approximately identical with each other. Alternatively, the sharpness with respect to a scanning direction, which is associated with a high sharpness, may be suppressed so as to become approximately identical with a low sharpness with respect to the other scanning direction, and the sharpness with respect to the two scanning directions may thereby be set to be approximately identical with each other.

With the first image recording and read-out method and the first image recording and read-out apparatus in accordance with the present invention, the anisotropic fluorescent material screen is located between the object and the two-dimensional image read-out means, which should preferably be of the photo reading type, and the operation for recording and reading out the image of the object is performed in this state. The fluorescence produced within the anisotropic fluorescent material screen diffuses in the fluorescent material-filled regions and becomes blurred. However, the fluorescence is reflected by the fluorescence reflecting partition wall members of the anisotropic fluorescent material screen. Therefore, with respect to the array direction of the fluorescence reflecting partition wall members, along which the partition wall members stand side by side, the fluorescence does not spread beyond the array pitch of the partition wall members. Accordingly, deterioration in sharpness with respect to the array direction of the fluorescence reflecting partition wall members, along which the partition wall members stand side by side, can be reduced.

With the second image recording and read-out method and the second image recording and read-out apparatus in accordance with the present invention, the anisotropic fluorescent material screen, in which the direction of anisotropy is the one-dimensional direction alone, is located such that the direction of anisotropy is approximately normal to the array direction of the linear electrodes, along which the linear electrodes stand side by side. Therefore, with respect to the array direction of the linear electrodes, along which the linear electrodes stand side by side, no moire occurs.

With the third image recording and read-out method and the third image recording and read-out apparatus in accordance with the present invention, the difference between the spatial frequency of the read-out pitch of the image signal detected with the two-dimensional image read-out means and the spatial frequency of the anisotropy pitch of the anisotropic fluorescent material screen is set at a value of at least 1 cycle/mm. Therefore, as will be described later, in cases where the spatial frequency fO of the read-out pitch cannot be set to be at least two times as high as the spatial frequency fG of the anisotropy pitch, the number of perceptible streaks periodically occurring in the obtained image can be decreased. In this manner, the moire occurring in the image can be rendered visually imperceptible.

In such cases, the signal components, which are contained in the image signal having been detected with the two-dimensional image read-out means and which carry the moire frequency occurring due to the anisotropic fluorescent material screen, should preferably be suppressed. In this manner, the moire occurring in the image can be rendered visually imperceptible. Also, in such cases, there is no risk that the important components of at most 1 cycle/mm, which are contained in the image information, will be lost.

With the fourth image recording and read-out method and the fourth image recording and read-out apparatus in accordance with the present invention, such that no moire component may occur, the spatial frequency of the readout pitch of the image signal detected with the two-dimensional image read-out means is set at a value at least two times as high as the spatial frequency of the anisotropy pitch of the anisotropic fluorescent material screen. Therefore, in accordance with the so-called "sampling theorem," theoretically, the streak-like pattern in the image due to the moire phenomenon do not occur.

In such cases, the streak-like pattern representing the partition wall members of the anisotropic fluorescent material screen appears in the obtained image. However, with the fourth image recording and read-out method and the fourth image recording and read-out apparatus in accordance with the present invention, wherein the signal components, which are contained in the image signal having been detected with the two-dimensional image read-out means and which carry the spatial frequency of the anisotropy pitch of the anisotropic fluorescent material screen, are suppressed, the streak-like pattern representing the partition wall members of the anisotropic fluorescent material screen can be rendered visually imperceptible.

With the fifth image recording and read-out method and the fifth image recording and read-out apparatus in accordance with the present invention, in cases where the anisotropic fluorescent material screen, in which the direction of anisotropy is the one-dimensional direction alone, is employed, the sharpness of the image signal, which has been detected with the two-dimensional image read-out means, with respect to the main scanning direction and the sharpness of the image signal with respect to the sub-scanning direction are set to be approximately identical with each other. Therefore, the problems can be prevented from occurring in that the sharpness with respect to the main scanning direction and the sharpness with respect to the sub-scanning direction become different from each other and thus become unbalanced.

With the image recording and read-out method and apparatus in accordance with the present invention, wherein the first example of the anisotropic fluorescent material screen having the structure, in which the stripe-like partition walls of each of the striped fluorescent material layers intersect at an angle of approximately 90° with the stripe-like partition walls of an adjacent striped fluorescent material layer, is employed, the fluorescence produced in the top striped fluorescent material layer due to exposure to the radiation diffuses slightly in the direction parallel to the stripes and is prevented by the partition walls from diffusing in the direction normal to the stripes. In the next striped fluorescent material layer, the direction of restriction of the diffusion is reversed. As a result, as with a two-dimensional cell structure, a radiation image, in which the image quality with respect to the direction (the main scanning direction) normal to the stripes in the top striped fluorescent material layer and the image quality with respect to the direction (the sub-scanning direction) parallel to the stripes in the top striped fluorescent material layer are well-balanced, can be obtained. Therefore, the image recording and read-out method and apparatus in accordance with the present invention, wherein the first example of the anisotropic fluorescent material screen is employed, is advantageous particularly for use in a technique for forming a radiation image for medical diagnosis.

With the image recording and read-out method and apparatus in accordance with the present invention, wherein the first example of the anisotropic fluorescent material screen having the structure, in which the stripe-like partition walls of each of the striped fluorescent material layers intersect at an angle of approximately 60° with the stripe-like partition walls of an adjacent striped fluorescent material layer, is employed, the aperture ratio is not reduced markedly, and a radiation image, in which the image quality with respect to the main scanning direction and the image quality with respect to the sub-scanning direction are well-balanced, can be obtained.

Also, in cases where the first example of the anisotropic fluorescent material screen is composed of two to ten striped fluorescent material layers overlaid one upon another, a radiation image, in which the image quality with respect to the main scanning direction and the image quality with respect to the sub-scanning direction are well-balanced, can be obtained, and the anisotropic fluorescent material screen can be produced reliably with a comparatively simple production process.

In cases where the second example of the anisotropic fluorescent material screen is employed, the formation of the fluorescent material film, the grooving, and the filling of the grooves with the composition containing the partition wall material can be performed continuously. Also, the anisotropic fluorescent material screen can be produced with three or four steps, i.e. the step of forming the fluorescent material film, the step of grooving, the step of filling the grooves with the composition containing the partition wall material (which step maybe performed simultaneously with the grooving step), and the step of overlaying the striped fluorescent material films one upon another. Therefore, the anisotropic fluorescent material screen can be produced with the process, which is simpler than conventional techniques and is composed of smaller number of steps than with the conventional techniques.

In cases where the third example of the anisotropic fluorescent material screen is employed, the formation of the fluorescent material film, the grooving, the filling of the grooves with the composition containing the partition wall material, and the formation of the partition wall layer can be performed continuously. Also, the anisotropic fluorescent material screen can be produced with four or five steps, i.e. the step of forming the fluorescent material film, the step of grooving, the step of filling the grooves with the composition containing the partition wall material (which step may be performed simultaneously with the grooving step), the step of overlaying the striped fluorescent material films one upon another, and the step of slicing. Therefore, the anisotropic fluorescent material screen can be produced with the process, which is simpler than the conventional techniques and is composed of smaller number of steps than with the conventional techniques.

BRIEF DESCRIPTION OF THE DRAWINGS

FIG. 2A is a schematic perspective view showing the anisotropic fluorescent material screen in the embodiment of FIG. 1A, FIG. 2B is an enlarged plan view showing the anisotropic fluorescent material screen of FIG. 2A, FIG. 2C is a sectional view taken on line I—I of FIG. 2B, FIG. 5A is a schematic perspective view showing an anisotropic fluorescent material screen, in which the fluorescence reflecting partition wall members are arrayed in a checkered pattern, FIG. 5B is an enlarged plan view showing the anisotropic fluorescent material screen of FIG. 5A, FIG. 5C is a sectional view taken on line I—I of FIG. 5B, FIG. 6A is a schematic perspective view showing a striped fluorescent material film, which is employed in the first example of the anisotropic fluorescent material screen, FIG. 6B is an exploded schematic perspective view showing the first example of the anisotropic fluorescent material screen, FIG. 6C is an exploded schematic perspective view showing a modification of the first example of the anisotropic fluorescent material screen, FIG. 8A is an explanatory front view showing a blade utilized in a process for producing the second example of the anisotropic fluorescent material screen, FIG. 8B is an explanatory front view showing connected blades composed of a plurality of blades, FIG. 8C is a schematic sectional view showing the step of forming a plurality of grooves in a long fluorescent material film, FIG. 11A is a block diagram showing an embodiment of the image recording and read-out apparatus in accordance with the present invention, which is provided with sharpness balancing means, FIG. 11B is an explanatory graph showing how a low sharpness with respect to a direction X is enhanced so as to become identical with a high sharpness with respect to a direction Y, and FIG. 11C is an explanatory graph showing how a high sharpness with respect to the direction Y is suppressed so as to become identical with a low sharpness with respect to the direction X.

DESCRIPTION OF THE PREFERRED EMBODIMENTS

The present invention will hereinbelow be described in further detail with reference to the accompanying drawings.

Firstly, an embodiment of the image recording and read-out apparatus in accordance with the present invention, wherein an improved direct conversion type of solid-state radiation detector, which is one of photo reading types, is employed as two-dimensional image read-out means, will be described hereinbelow with reference to FIGS. 1A, 1B, 1C and FIGS. 2A, 2B, 2C.

Figure 1A:
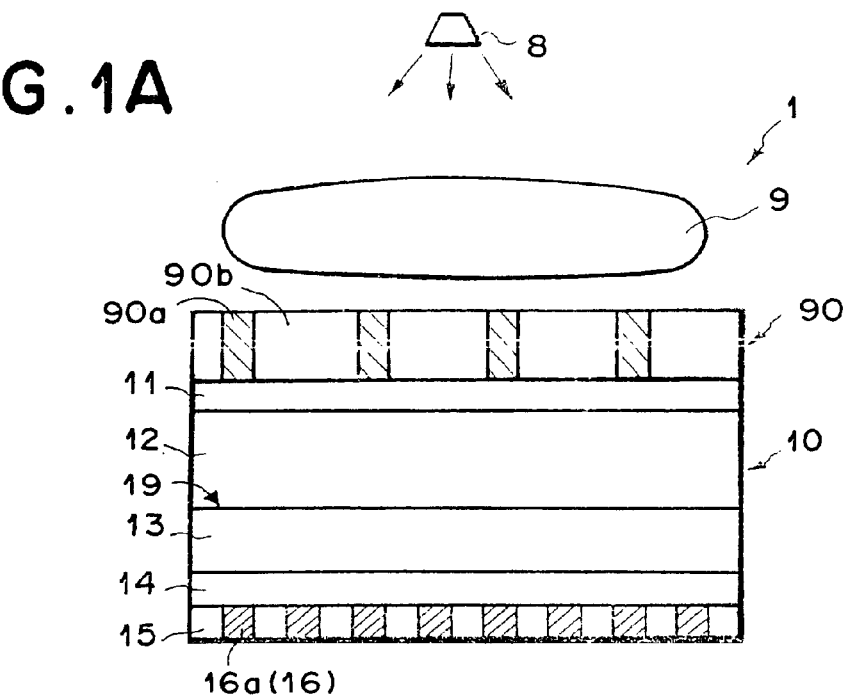
FIG. 1A is a schematic side view showing an embodiment of the image recording and read-out apparatus in accordance with the present invention, in which a solid-state radiation detector is illustrated in section.
Figure 1B:
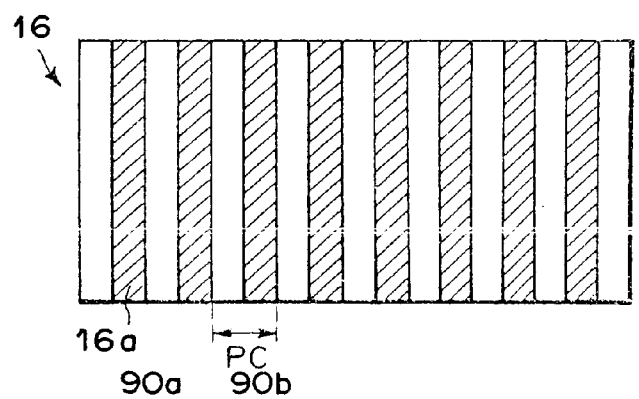
FIG. 1B is a plan view showing the solid-state radiation detector in the embodiment of FIG. 1A, as viewed from the side of a second electrical conductor layer.
Figure 1C:
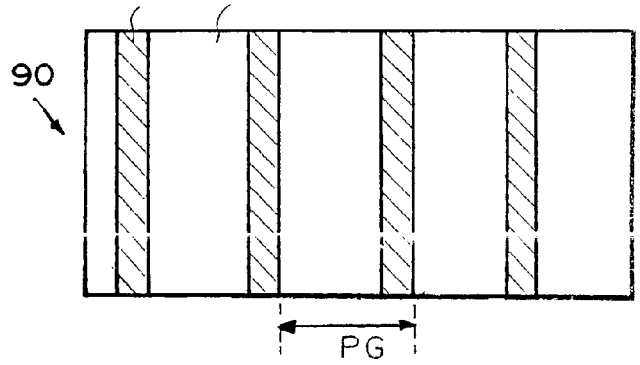
FIG. 1C is a plan view showing an anisotropic fluorescent material screen in the embodiment of FIG. 1A so as to correspond to FIG. 1B.

FIG. 1A is a schematic side view showing an embodiment of the image recording and read-out apparatus in accordance with the present invention, in which an improved direct conversion type of solid-state radiation detector is illustrated in section. FIG. 1B is a plan view showing the solid-state radiation detector in the embodiment of FIG. 1A, as viewed from the side of a second electrical conductor layer. FIG. 1C is a plan view showing an anisotropic fluorescent material screen in the embodiment of FIG. 1A so as to correspond to FIG. 1B. FIG. 2A is a schematic perspective view showing the anisotropic fluorescent material screen in the embodiment of FIG. 1A. FIG. 2B is an enlarged plan view showing the anisotropic fluorescent material screen of FIG. 2A. FIG. 2C is a sectional view taken on line I—I of FIG. 2B.

As illustrated in FIG. 1A, an image recording and read-out apparatus 1 comprises a radiation source 8, which produces radiation, such as X-rays, acting as a recording electromagnetic wave. The image recording and read-out apparatus 1 also comprises an improved direct conversion type of solid-state radiation detector 10, which acts as two-dimensional image read-out means. The image recording and read-out apparatus 1 further comprises an anisotropic fluorescent material screen 90, which is located between the radiation source 8 and the solid-state radiation detector 10.

The solid-state radiation detector 10 comprises a first electrical conductor layer (electrode layer) 11 having permeability to recording radiation, and a recording photoconductive layer 12, which exhibits electrical conductivity when it is exposed to the recording radiation having passed through the first electrical conductor layer 11. The solid-state radiation detector 10 also comprises a charge transporting layer 13, which acts approximately as an insulator with respect to electric charges having a polarity identical with the polarity of electric charges occurring in the first electrical conductor layer 11, and which acts approximately as a conductor with respect to electric charges having a polarity opposite to the polarity of the electric charges occurring in the first electrical conductor layer 11. The solid-state radiation detector 10 further comprises a reading photoconductive layer 14, which exhibits electrical conductivity when it is exposed to a reading electromagnetic wave, and a second electrical conductor layer (electrode layer) 15 having permeability to the reading electromagnetic wave.

The layers 11, 12, 13, 14, and 15 are overlaid in this order. A charge accumulating section 19 for accumulating latent image charges is formed at an interface between the recording photo-conductive layer 12 and the charge transporting layer 13.

As indicated by the hatching in FIG. 1B, the second electrical conductor layer 15 constitutes a striped electrode 16 comprising a plurality of elements (linear electrodes) 16a, 16a, . . . for acquiring an electric signal proportional to the amount of the latent image charges. The elements 16a, 16a, . . . are arrayed in a striped pattern at a predetermined pitch PC (mm) so as to stand side by side in a direction, which is approximately normal to a longitudinal direction of each element 16a.

As illustrated in FIGS. 2B and 2C, the anisotropic fluorescent material screen 90 has a structure, in which the area filled with a fluorescent material is partitioned into a plurality of fluorescent material-filled regions 90b, 90b, . . . in a stripe-like form by fluorescence reflecting partition wall members 90a, 90a, . . . extending in the direction of a thickness d of the anisotropic fluorescent material screen 90. In the anisotropic fluorescent material screen 90, the direction of anisotropy is the one-dimensional direction alone. As illustrated in FIG. 1C, in the anisotropic fluorescent material screen 90, the interval between adjacent partition wall members 90a, 90a constitutes a predetermined pitch PG (mm). The anisotropic fluorescent material screen 90 is located such that the array direction of the partition wall members 90a, 90a, . . . , along which the partition wall members 90a, 90a, . . . stand side by side, i.e. the direction of anisotropy of the anisotropic fluorescent material screen 90, coincides with the array direction of the elements 16a, 16a, . . . , along which the elements 16a, 16a, . . . stand side by side. In cases where the array direction of the partition wall members 90a, 90a, . . . and the array direction of the elements 16a, 16a, . . . thus coincide with each other, no limitation is imposed upon the relationship between the positions of the elements 16a, 16a, . . . and the positions of the partition wall members 90a, 90a, . . . .

The fluorescent material-filled regions 90b, 90b, . . . of the anisotropic fluorescent material screen 90 are set such that a scattering length $1/\alpha b$ with respect to light, which is produced within the fluorescent material-filled regions 90b, 90b, . . . when the fluorescent material-filled regions 90b, 90b, . . . are exposed to the recording electromagnetic wave (in this embodiment, radiation), falls within the range of 20 $\mu$m to 200 $\mu$m, and an absorption length $1/\beta b$ with respect to the light is at least 1,000 $\mu$m. If the scattering length $1/\alpha b$ is shorter than 20 $\mu$m, the light produced at positions in the vicinity of the radiation irradiation side surface of the anisotropic fluorescent material screen 90 cannot travel to the solid-state radiation detector 10, which is located on the side opposite to the radiation irradiation side surface of the anisotropic fluorescent material screen 90. Therefore, the light produced at positions in the vicinity of the radiation irradiation side surface of the anisotropic fluorescent material screen 90 cannot be detected, and the sensitivity becomes low. The partition wall members 90a, 90a, . . . of the anisotropic fluorescent material screen 90 are set such that a scattering length $1/\alpha a$ with respect to the light, which is produced within the fluorescent material-filled regions 90b, 90b, . . . , falls within the range of 0.05 $\mu$m to 20 $\mu$m, and an absorption length $1/\beta a$ with respect to the light is at least 1,000 $\mu$m. If the scattering length $1/\alpha a$ is longer than 20 $\mu$m, the light produced within the fluorescent material-filled regions 90b, 90b, . . . will spread beyond the partition wall members 90a, 90a, . . . , and the sharpness will become low. If the absorption length $1/\beta a$ of the partition wall members 90a, 90a, . . . and the absorption length $1/\beta b$ of the fluorescent material-filled regions 90b, 90b, . . . are shorter than 1,000 $\mu$m, the light produced within the fluorescent material-filled regions 90b, 90b, . . . will be absorbed by the partition wall members 90a, 90a, . . . and the fluorescent material-filled regions 90b, 90b, . . . , and therefore the sensitivity will become low. The ratio, $1/\alpha b : 1/\alpha a$, of the scattering length $1/\alpha b$ of the fluorescent material-filled regions 90b, 90b, . . . to the scattering length $1/\alpha a$ of the partition wall members 90a, 90a, . . . should preferably be at least 3.0:1. If the ratio is lower than 3.0:1, the optical confinement effects within the fluorescent material-filled regions 90b, 90b, . . . will become insufficient, and the balance between the sharpness and the intensity of the emitted light will become bad.

The term "scattering length with respect to light" ($1/\alpha a$, $1/\alpha b$) as used herein means the mean path, by which the light travels straightly before the light is scattered one time. A short scattering length represents high light scattering characteristics. The term "absorption length with respect to light" ($1/\beta a$, $1/\beta b$) as used herein means the mean free path, by which the light travels before the light is absorbed. A long absorption length represents low light absorptivity. As described in Japanese Patent Application No. 11(1999)-134599 filed by the applicant, the light scattering length and the light absorption length are the values calculated from measured values of the thickness d of the anisotropic fluorescent material screen 90 and a transmittance T, the calculation being made with Formula (1) shown below in accordance with the Kubelka's theory.

$$T(d)=(\eta-\xi)/(\eta e\gamma^2-\xi e^{-\gamma^2}) \quad (1)$$

$\gamma^2=\beta(\beta+2\alpha)$
$\xi=(\alpha+\beta-\gamma)/\alpha$
$\eta=(\alpha+\beta+\gamma)/\beta$ in which $\alpha$ is representative of $\alpha a$ and $\alpha b$, and $\beta$ is representative of $\beta a$ and $\beta b$.

The scattering length $1/\alpha$ and the absorption length $1/\beta$ can be calculated by substituting the measured value of the thickness d and the measured value of the transmittance T into Formula (1) and performing optimization with the method of least squares, or the like.

The anisotropic fluorescent material screen 90 may take one of other preferable forms listed below.
1) The anisotropic fluorescent material screen 90, wherein the fluorescent material-filled regions 90b, 90b, . . . comprise a binder and a fluorescent material dispersed therein.
2) The anisotropic fluorescent material screen 90, wherein the volume ratio of a fluorescent material in the fluorescent material-filled regions 90b, 90b, . . . falls within the range of 40% to 95%, and the volume ratio of voids (air) in the fluorescent material-filled regions 90b, 90b, . . . falls within the range of 0% to 20%.
3) The anisotropic fluorescent material screen 90, wherein the partition wall members 90a, 90a, . . . comprise a high-molecular weight substance and low-light absorptivity fine particles dispersed therein.
4) The anisotropic fluorescent material screen 90, wherein the volume ratio of low-light absorptivity fine particles in the partition wall members 90a, 90a, . . . falls within the range of 30% to 90%.
5) The anisotropic fluorescent material screen 90, wherein a particle diameter of low-light absorptivity fine particles in the partition wall members 90a, 90a, . . . falls within the range of 0.01 $\mu$m to 5.0 $\mu$m.

6) The anisotropic fluorescent material screen 90, wherein low-light absorptivity fine particles in the partition wall members 90*a*, 90*a*, . . . are fine alumina particles.
7) The anisotropic fluorescent material screen 90, wherein the partition wall members 90*a*, 90*a*, . . . further contain voids.
8) The anisotropic fluorescent material screen 90, wherein the volume ratio of voids in partition wall members 90*a*, 90*a*, . . . falls within the range of 10% to 70%.
9) The anisotropic fluorescent material screen 90, wherein the ratio of a refractive index of low-light absorptivity fine particles in the partition wall members 90*a*, 90*a*, . . . to a refractive index of voids (air) in the partition wall members 90*a*, 90*a*, . . . falls within the range between 1.1:1 and 3.0:1.
10) The anisotropic fluorescent material screen 90, wherein the partition wall members 90*a*, 90*a*, . . . further contain a fluorescent material.
11) The anisotropic fluorescent material screen 90, wherein the partition wall members 90*a*, 90*a*, . . . are capable of absorbing the fluorescence produced by the fluorescent material-filled regions 90*b*, 90*b*, . . . .
12) The anisotropic fluorescent material screen 90 having a thickness falling within the range of 50 μm to 1,500 μm.
13) The anisotropic fluorescent material screen 90, wherein the widths of the partition wall members 90*a*, 90*a*, . . . and the fluorescent material-filled regions 90*b*, 90*b*, . . . are set such that the area ratio of the fluorescent material-filled regions 90*b*, 90*b*, . . . , i.e. the aperture ratio, with respect to the entire surface area of the anisotropic fluorescent material screen 90 falls within the range of 40% to 98%.

With the radiation image recording and read-out apparatus 1, a radiation image is recorded with the solid-state radiation detector 10 and read out in the manner described below. Specifically, firstly, a D.C. voltage is applied across the first electrical conductor layer 11 and the striped electrode 16 of the second electrical conductor layer 15, and the two electrical conductor layers are electrically charged. The solid-state radiation detector is located such that the surface on the side of the first electrical conductor layer 11 may stand facing the radiation source 8, and radiation carrying image information of an object 9 is irradiated to the first electrical conductor layer 11 via the anisotropic fluorescent material screen 90. The radiation, which has passed through the first electrical conductor layer 11, impinges upon the recording photo-conductive layer 12. As a result, electric charge pairs of electrons (negative charges) and holes (positive charges) occur in the recording photo-conductive layer 12. The negative charges or the positive charges are accumulated as latent image charges, which carry the radiation image information, at the charge accumulating section 19, which is formed at the interface between the recording photo-conductive layer 12 and the charge transporting layer 13. Thereafter, from the side of the striped electrode 16, a line-like reading electromagnetic wave is caused to scan the elements 16*a*, 16*a*, . . . along the longitudinal direction of each element 16*a*. As a result, electric charge pairs of electrons (negative charges) and holes (positive charges) occur in the reading photo-conductive layer 14. Also, electric charges (transported polarity charges) having the polarity opposite to the polarity of the latent image charges move through the charge transporting layer 13 toward the recording photo-conductive layer 12. When the transported polarity charges arrive at the charge accumulating section 19, charge recombination occurs between the latent image charges, which are accumulated at the charge accumulating section 19, and the transported polarity charges. As a result, an electric current in accordance with the latent image charges flows through each of the elements 16*a*, 16*a*, . . . . The electric current occurring from the charge recombination is detected by a signal processing circuit (not shown) and with respect to each of the elements 16*a*, 16*a*, . . . , and an image signal is thereby obtained. A signal detected from the respective elements 16*a*, 16*a*, . . . is the signal in the main scanning direction. The scanning with the line-like reading electromagnetic wave in the longitudinal direction of each element 16*a* corresponds to the sub-scanning.

The radiation, which has been produced by the radiation source 8, is irradiated to the object 9 (such as a human body). At this time, absorption, scattering, and passage of the radiation occur in accordance with substances contained in the object 9, and the radiation carrying image information of the object 9 travels toward the anisotropic fluorescent material screen 90. When the radiation impinges upon the anisotropic fluorescent material screen 90, the fluorescence is produced within the anisotropic fluorescent material screen 90. The produced fluorescence travels toward the first electrical conductor layer 11. At this time, the fluorescence diffuses and becomes blurred in the fluorescent material-filled regions 90*b*, 90*b*, . . . . However, the fluorescence is reflected by the partition wall members 90*a*, 90*a*, . . . . Therefore, with respect to the array direction of the partition wall members 90*a*, 90*a*, . . . , along which the partition wall members 90*a*, 90*a*, . . . stand side by side, the fluorescence does not spread beyond the array pitch PG of the partition wall members 90*a*, 90*a*, . . . . Accordingly, deterioration in sharpness with respect to the array direction of the partition wall members 90*a*, 90*a*, . . . , along which the partition wall members 90*a*, 90*a*, . . . stand side by side, can be reduced.

In cases where the spatial frequency fC of the readout with the solid-state radiation detector 10, which acts as the two-dimensional image read-out means, along the main scanning direction, i.e. the spatial frequency fC of the array pitch of the elements 16*a*, 16*a*, . . . , which spatial frequency is represented by the formula of fC=1/PC (cycle/mm), is set to be at least two times as high as the spatial frequency fG of the array pitch of the partition wall members 90*a*, 90*a*, . . . , i.e. the spatial frequency fG of the anisotropy pitch, which spatial frequency is represented by the formula of fG=1/PG (cycle/mm), as will be estimated from the sampling theorem, a periodical streak-like pattern due to a moire phenomenon does not occur theoretically with respect to the array direction of the partition wall members 90*a*, 90*a*, . . . , along which the partition wall members 90*a*, 90*a*, . . . stand side by side, regardless of the relationship between the positions of the elements 16*a*, 16*a*, . . . and the positions of the partition wall members 90*a*, 90*a*, . . . . In such cases, signal components representing the pattern of the anisotropic fluorescent material screen 90 itself are detected. Therefore, in accordance with the relationship between the positions of the elements 16*a*, 16*a*, . . . and the positions of the partition wall members 90*a*, 90*a*, . . . , it often occurs that a streak-like image pattern representing the partition wall members 90*a*, 90*a*, . . . is superposed upon the object image. As a result, it often occurs that the object image becomes hard to see.

Accordingly, such that the signal components representing the pattern of the partition wall members 90*a*, 90*a*, . . . may be eliminated, the signal components SG, which are contained in the image signal having been detected by the two-dimensional image read-out means (in this embodiment, the solid-state radiation detector 10) and which carry the spatial frequency fG of the anisotropy pitch PG of the anisotropic fluorescent material screen 90, i.e. the signal components SG carrying the spatial frequency fG (=1/PG) represented by the reciprocal of the array pitch PG of the partition wall members 90a, 90a, . . . , are suppressed. In this manner, the pattern of the partition wall members 90a, 90a, . . . occurring in the image can be rendered visually imperceptible.

Figure 3A:
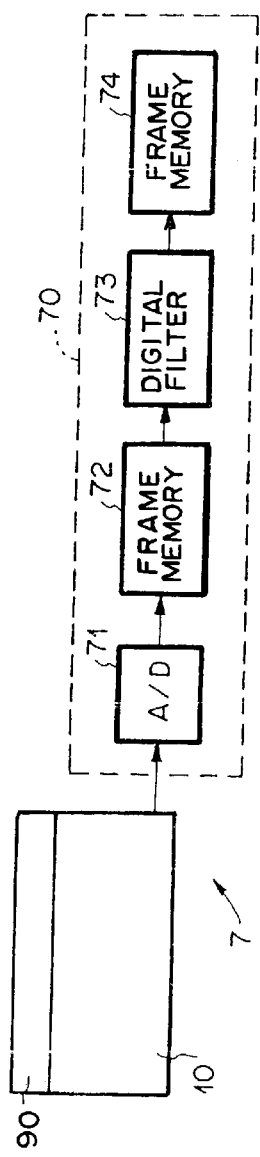
FIG. 3A is a block diagram showing an embodiment of the image recording and read-out apparatus in accordance with the present invention, which is provided with image processing means.

FIG. 3A is a block diagram showing a radiation image recording and read-out apparatus 7 provided with image processing means 70 for eliminating the signal components representing the pattern of the partition wall members 90a, 90a, . . . themselves. The image processing means 70 acts as the first image processing means of the image recording and read-out apparatus in accordance with the present invention.

As illustrated in FIG. 3A, the radiation image recording and read-out apparatus 7 comprises the radiation image recording and read-out apparatus 1 described above and the image processing means 70 connected to the radiation image recording and read-out apparatus 1. The image processing means 70 comprises an analog-to-digital converter 71 for converting an analog output signal, which has been obtained from the solid-state radiation detector 10, into a digital signal, and a frame memory 72 for storing the digital signal. The image processing means 70 also comprises a digital filter 73 for suppressing the signal components SG, which are contained in the signal received from the frame memory 72 and which carry the spatial frequency fG described above. The image processing means 70 further comprises a frame memory 74 for storing an output signal obtained from the digital filter 73.

Figure 3C:
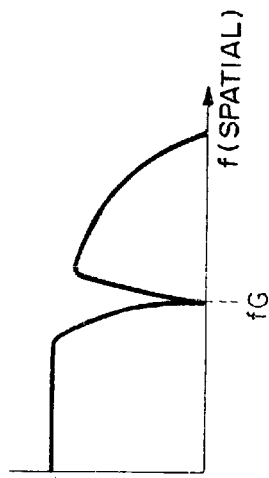
FIG. 3C is a graph showing an example of characteristics of a filter for suppressing signal components, which carry a spatial frequency of an anisotropy pitch of the anisotropic fluorescent material screen.
Figure 3D:
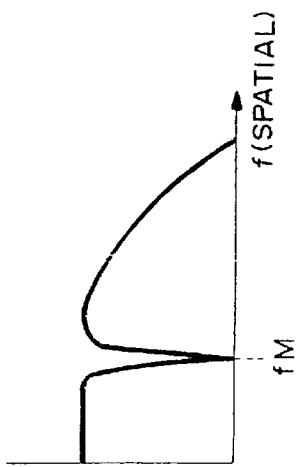
FIG. 3D is a graph showing an example of characteristics of a filter for suppressing signal components, which carry a moire frequency occurring due to the anisotropic fluorescent material screen.
Figure 3B:
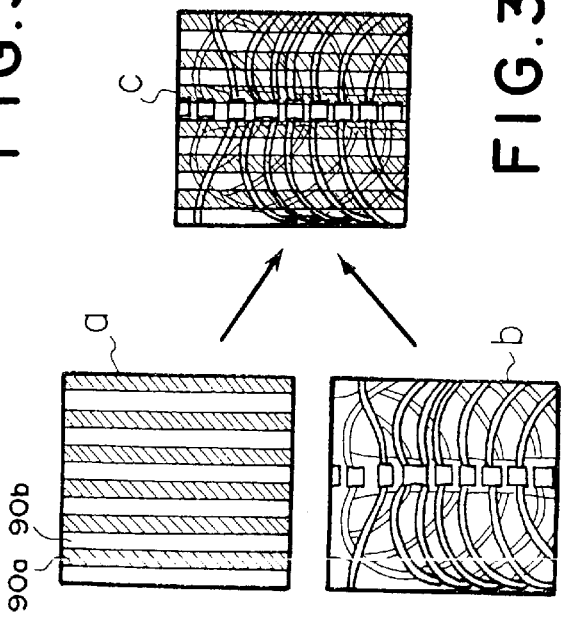
FIG. 3B is an explanatory view showing an image represented by an output signal obtained from two-dimensional image read-out means.

With the radiation image recording and read-out apparatus 7, the output signal obtained from the solid-state radiation detector 10 is stored in the frame memory 72. The output signal contains the signal components representing the pattern of the anisotropic fluorescent material screen 90. If an image is reproduced from the output signal, an image "c" shown in FIG. 3B will be obtained. As illustrated in FIG. 3B, in accordance with the relationship between the positions of the elements 16a, 16a, . . . and the positions of the partition wall members 90a, 90a, . . . , it often occurs that, in the image "c," an image "a" of a vertical streak-like pattern representing the partition wall members 90a, 90a, . . . is superposed upon an object image "b."

The digital filter 73 suppresses the signal components representing the image "a" of the streak-like pattern representing the partition wall members 90a, 90a, . . . , i.e. the signal components SG carrying the spatial frequency fG described above. FIG. 3C shows an example of amplitude characteristics of the digital filter 73. Since the signal components SG carrying the spatial frequency fG described above have been suppressed by the digital filter 73, the output signal obtained from the digital filter 73 contains approximately only the signal representing the object image "b" shown in FIG. 3B. The thus obtained signal is stored in the frame memory 74, and the stored signal is read when it is to be used for making a diagnosis, or the like.

In this embodiment, as the means for suppressing the signal components SG, which are contained in the image signal having been detected by the solid-state radiation detector 10 and which carry the spatial frequency fG of the anisotropy pitch PG of the anisotropic fluorescent material screen 90, the digital filter 73 is employed. Alternatively, an analog filter may be employed for such purposes. Specifically, in the embodiment described above, the anisotropic fluorescent material screen 90 is provided with the partition wall members 90a, 90a, . . . arrayed so as to stand side by side in the main scanning direction. Therefore, a simple trap (a band elimination filter) for suppressing the signal components SG carrying the spatial frequency fG described above may be employed.

In cases where the spatial frequency fC of the readout with the solid-state radiation detector 10 along the main scanning direction cannot be set to be at least two times as high as the spatial frequency fG of the anisotropy pitch, the difference between the spatial frequency fC of the array pitch of the elements 16a, 16a, . . . , which spatial frequency is represented by the formula of A fC=1/PC (cycle/mm), and the spatial frequency fG of the array pitch of the partition wall members 90a, 90a, . . . , which spatial frequency is represented by the formula of fG=1/PG (cycle/mm), the difference representing the moire frequency, may be set to be at least 1 cycle/mm. In this manner, the number of the perceptible vertical streaks periodically occurring in the image can be decreased, and the moire can be rendered visually imperceptible.

In such cases, the signal components SM, which are contained in the image signal having been detected by the two-dimensional image read-out means (in this embodiment, the solid-state radiation detector 10) and which carry the moire frequency occurring due to the anisotropic fluorescent material screen 90 (specifically, the partition wall members 90a, 90a, . . . ), may be suppressed. In this manner, the moire can be rendered visually imperceptible. In such cases, there is no risk that the important components of at most 1 cycle/mm, which are contained in the image information, will be lost.

For such purposes, for example, the digital filter 73 of the image processing means 70 shown in FIG. 3A may be set so as to suppress the signal components SM carrying the moire frequency occurring due to the anisotropic fluorescent material screen 90. In this manner, the image processing means 70 may be set so as to act as the second image processing means of the image recording and read-out apparatus in accordance with the present invention. FIG. 3D shows an example of amplitude characteristics of the digital filter 73 which is set for such purposes.

A different embodiment of the radiation image recording and read-out apparatus in accordance with the present invention, in which the anisotropic fluorescent material screen 90 is located such that the array direction of the partition wall members 90a, 90a, . . . , i.e. the direction of anisotropy, is approximately normal to the array direction of the elements 16a, 16a, . . . , will be described hereinbelow with reference to FIGS. 4A, 4B, and 4C.

Figure 4A:
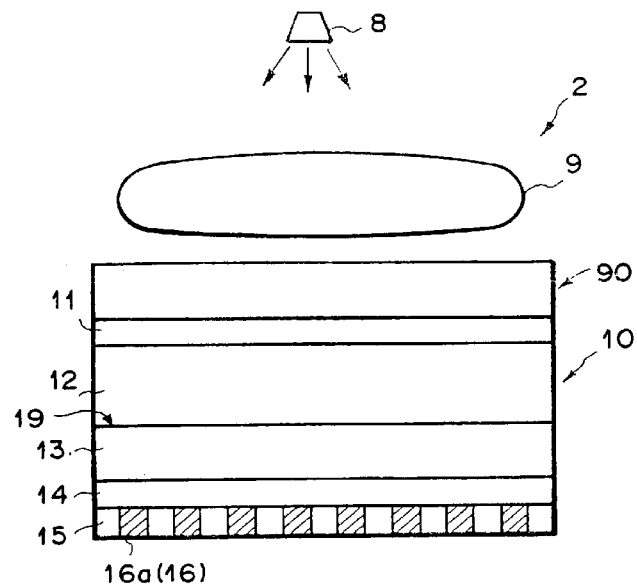
FIG. 4A is a schematic side view showing an embodiment of the image recording and read-out apparatus in accordance with the present invention, in which a solid-state radiation detector is illustrated in section and an array direction of fluorescence reflecting partition wall members in an anisotropic fluorescent material screen is different from that in the embodiment of FIG. 1A.
Figure 4B:
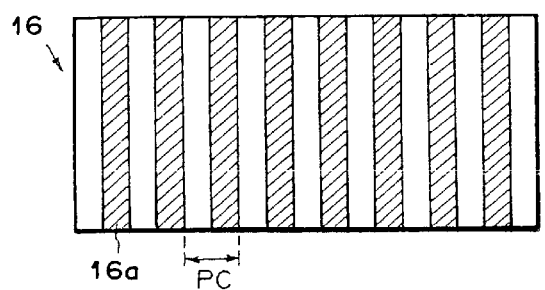
FIG. 4B is a plan view showing the solid-state radiation detector in the embodiment of FIG. 4A, as viewed from the side of a second electrical conductor layer.

FIG. 4A is a schematic side view showing an embodiment of the image recording and read-out apparatus in accordance with the present invention, in which a solid-state radiation detector is illustrated in section and an array direction of fluorescence reflecting partition wall members in an anisotropic fluorescent material screen is different from that in the embodiment of FIG. 1A. FIG. 4B is a plan view showing the solid-state radiation detector in the embodiment of FIG. 4A, as viewed from the side of a second electrical conductor layer. FIG. 4C is a plan view showing the anisotropic fluorescent material screen in the embodiment of FIG. 4A so as to correspond to FIG. 4B.

Figure 4C:
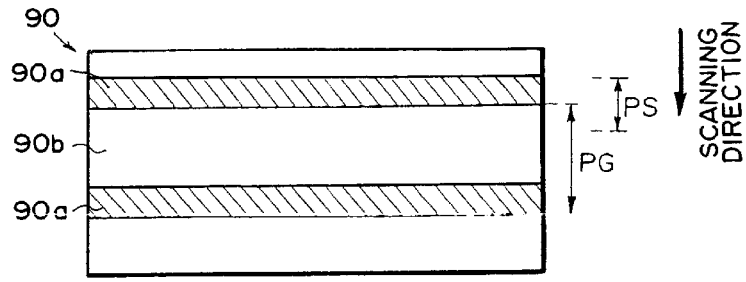
FIG. 4C is a plan view showing the anisotropic fluorescent material screen in the embodiment of FIG. 4A so as to correspond to FIG. 4B.

As illustrated in FIG. 4C, in the anisotropic fluorescent material screen 90 of a radiation image recording and read-out apparatus 2, the interval between adjacent partition wall members 90a, 90a constitutes a predetermined pitch PG (mm). The anisotropic fluorescent material screen 90 is located such that the array direction of the partition wall members 90a, 90a, . . . , along which the partition wall members 90a, 90a, . . . stand side by side, i.e. the direction of anisotropy of the anisotropic fluorescent material screen 90, is approximately normal to the array direction of the elements 16a, 16a, . . . , along which the elements 16a, 16a, . . . stand side by side. Specifically, basically, the radiation image recording and read-out apparatus 2 has the same constitution as that in the radiation image recording and read-out apparatus 1 described above, except that the array direction of the partition wall members 90a, 90a, . . . is varied.

With the radiation image recording and read-out apparatus 2, a radiation image is recorded with the solid-state radiation detector 10 and read out in the same manner as that in the radiation image recording and read-out apparatus 1 described above. With the radiation image recording and read-out apparatus 2, wherein the anisotropic fluorescent material screen 90 is employed, the deterioration of sharpness with respect to the array direction of the partition wall members 90a, 90a, . . . can be reduces. Also, since the anisotropic fluorescent material screen 90 is located such that the direction of anisotropy in the anisotropic fluorescent material screen 90 is approximately normal to the array direction of the elements 16a, 16a, . . . , periodical streak-like pattern due to the moire phenomenon does not occur with respect to the array direction of the elements 16a, 16a, . . . .

In cases where the spatial frequency fS of the readout in the sub-scanning direction, at which the latent image charges are read with scanning in the longitudinal direction of each element 16a, i.e. the spatial frequency fS of a sampling pitch, the spatial frequency fS being represented by the formula of fS=1/PS (cycle/mm), is set to be at least two times as high as the spatial frequency fG of the array pitch of the partition wall members 90a, 90a, . . . , which spatial frequency is represented by the formula of fG=1/PG (cycle/mm), a periodical streak-like pattern due to a moire phenomenon does not occur theoretically with respect to the array direction of the partition wall members 90a, 90a, . . . .

In cases where the spatial frequency fG of the array pitch of the partition wall members 90a, 90a, . . . cannot be set so as to satisfy the relationship described above, the difference between the spatial frequency fS of the sampling pitch, at which the latent image charges are read with scanning in the longitudinal direction of each element 16a, the spatial frequency fS being represented by the formula of fS=1/PS (cycle/mm), and the spatial frequency fG described above, which is represented by the formula of fG=1/PG (cycle/mm), the difference representing the moire frequency, may be set to be at least 1 cycle/mm. In this manner, the number of perceptible horizontal streaks periodically occurring in the image can be decreased, and therefore the moire can be rendered visually imperceptible.

In the embodiment of FIG. 4A, as described above with reference to FIGS. 3A, 3B, 3C, and 3D, the radiation image recording and read-out apparatus 2 may be provided with the image processing means for suppressing the signal components SG, which are contained in the image signal having been detected by the solid-state radiation detector 10 and which carry the spatial frequency fG described above, or the image processing means for suppressing the signal components SM, which are contained in the image signal having been detected by the solid-state radiation detector 10 and which carry the moire frequency occurring due to the anisotropic fluorescent material screen 90. In this manner, the pattern of the partition wall members 90a, 90a, . . . occurring in the image or the streak-like pattern periodically occurring in the image due to the moire can be rendered visually imperceptible.

In the radiation image recording and read-out apparatuses 1 and 2 described above, the partition wall members 90a, 90a, . . . of the anisotropic fluorescent material screen 90 are arrayed in one direction. However, in the radiation image recording and read-out apparatus in accordance with the present invention, the direction of anisotropy is not limited to one direction, and the anisotropic fluorescent material screen may have a structure, in which the fluorescent material-filled regions 90b, 90b, . . . , i.e. the fine cells, partitioned from one another by the partition wall members 90a, 90a, . . . are distributed in two-dimensional directions.

For example, as illustrated in FIGS. 5A, 5B, and 5C, an anisotropic fluorescent material screen 90', in which the partition wall members 90a, 90a, . . . are arrayed in a checkered pattern over the two-dimensional region of the anisotropic fluorescent material screen 90', may be employed. In such cases, the effects of the radiation image recording and read-out apparatus in accordance with the present invention can be obtained with respect to both the longitudinal direction of each element 16a (i.e., the sub-scanning direction) and the direction (i.e., the main scanning direction) approximately normal to the longitudinal direction of each element 16a.

In lieu of the anisotropic fluorescent material screen 90', in which the partition wall members 90a, 90a, . . . are arrayed in a checkered pattern, one of the first example, the second example, and the third example of the anisotropic fluorescent material screens described below may be employed.

Specifically, the first example is an anisotropic fluorescent material screen proposed by the applicant in Japanese Patent Application No. 2000-132356. The anisotropic fluorescent material screen comprises at least two striped fluorescent material layers, each of which is constituted of stripe-like partition walls for partitioning the anisotropic fluorescent material screen in a one-dimensional direction along a plane direction, and fluorescent material-filled regions partitioned by the stripe-like partition walls, the at least two striped fluorescent material layers being overlaid one upon the other such that the stripe-like partition walls of each of the striped fluorescent material layers intersect at a predetermined angle with the stripe-like partition walls of an adjacent striped fluorescent material layer.

FIG. 6A is a schematic perspective view showing a striped fluorescent material film 191 constituting an anisotropic fluorescent material screen 190, which is the first example of the anisotropic fluorescent material screen. In FIG. 6A, partition walls 192, 192, . . . are indicated by the hatching, and fluorescent material-filled regions 193, 193, . . . are indicated as unhatched regions.

The width of each of the partition walls 192, 192, . . . (the mean value of the widths of the partition walls 192, 192, . . . , which widths are taken in the plane direction), the width of each of the fluorescent material-filled regions 193, 193, . . . (the mean value of the widths of the fluorescent material-filled regions 193, 193, . . . , which widths are taken in the plane direction), the ratio of the area of the fluorescent material-filled regions 193, 193, . . . to the entire surface area of the striped fluorescent material film 191 (the aperture ratio), the scattering length and the absorption length of the partition walls 192, 192, . . . with respect to the fluorescence produced by the fluorescent material, and the scattering length and the absorption length of the fluorescent material-filled regions 193, 193, . . . with respect to the fluorescence produced by the fluorescent material should take the preferable values as described above for the anisotropic fluorescent material screen 90.

FIG. 6B is an exploded schematic perspective view showing the anisotropic fluorescent material screen 190, which comprises a plurality of striped fluorescent material films 191, 191, . . . having the structure shown in FIG. 6A. As illustrated in FIG. 6B, the striped fluorescent material films 191, 191, . . . are overlaid one upon another, such that the stripe-like partition walls 192, 192, . . . of each of the striped fluorescent material films 191, 191, . . . intersect perpendicularly (i.e., at an angle of 90°) with the partition walls 192, 192, . . . of the adjacent striped fluorescent material film 191. The striped fluorescent material films 191, 191, . . . are thus overlaid one upon another, such that the stripe direction in every third striped fluorescent material film 191 coincides with the stripe direction in every first striped fluorescent material film 191.

FIG. 6C is an exploded schematic perspective view showing an anisotropic fluorescent material screen 190', which is a modification of the first example of the anisotropic fluorescent material screen. As illustrated in FIG. 6C, the striped fluorescent material films 191, 191, . . . are overlaid one upon another, such that the stripe-like partition walls 192, 192, . . . of each of the striped fluorescent material films 191, 191, . . . intersect at an angle of 60° (specifically, 60°±1°) with the partition walls 192, 192, . . . of the adjacent striped fluorescent material film 191. The striped fluorescent material films 191, 191, . . . are thus overlaid one upon another, such that the stripe direction in every fourth striped fluorescent material film 191 coincides with the stripe direction in every first striped fluorescent material film 191.

In each of the anisotropic fluorescent material screens 190 and 190', the width of each partition wall 192 should preferably be kept the same among the striped fluorescent material films 191, 191, . . . . Also, the width of each fluorescent material-filled region 193 should preferably be kept the same among the striped fluorescent material films 191, 191, . . . . Further, the positions of the striped fluorescent material films 191, 191, . . . should preferably be adjusted such that the stripes in every third striped fluorescent material film 191 or every fourth striped fluorescent material film 191, whose stripe direction coincides with the stripe direction of every first striped fluorescent material film 191, coincide perfectly with the stripes in every first striped fluorescent material film 191.

In cases where the anisotropic fluorescent material screen 190 having the structure shown in FIG. 6B is employed, the fluorescence produced in the top striped fluorescent material film 191 due to exposure to the radiation diffuses slightly in the direction parallel to the stripes and is prevented by the partition walls 192, 192, . . . from diffusing in the direction normal to the stripes. In the next striped fluorescent material film 191, the direction of restriction of the diffusion is reversed. The cell shape, as viewed from above the anisotropic fluorescent material screen 190, is a square shape. As a result, as with a two-dimensional cell structure, a radiation image, in which the image quality with respect to the direction (the main scanning direction) normal to the stripes in the top striped fluorescent material film 191 and the image quality with respect to the direction (the sub-scanning direction) parallel to the stripes in the top striped fluorescent material film 191 are well-balanced, can be obtained. In cases where the anisotropic fluorescent material screen 190' having the structure shown in FIG. 6C is employed, the aperture ratio is not reduced markedly, and a radiation image, in which the image quality with respect to the main scanning direction and the image quality with respect to the sub-scanning direction are well-balanced, can be obtained. As for the anisotropic fluorescent material screen 190', the cell shape, as viewed from above the anisotropic fluorescent material screen 190', is a triangular shape.

In each of the anisotropic fluorescent material screens 190 and 190', four striped fluorescent material films 191, 191, . . . are overlaid one upon another. However, the number of the striped fluorescent material films 191, 191, . . . , which are overlaid one upon another, is not limited to four. For example, two to 100 striped fluorescent material films 191, 191, . . . may be overlaid one upon another, and two to ten striped fluorescent material films 191, 191, . . . should preferably be overlaid one upon another. In cases where the first example of the anisotropic fluorescent material screen is composed of two to ten striped fluorescent material films 191, 191, . . . overlaid one upon another, a radiation image, in which the image quality with respect to the main scanning direction and the image quality with respect to the sub-scanning direction are well-balanced, can be obtained, and the anisotropic fluorescent material screen can be produced with a simple production process.

By way of example, the anisotropic fluorescent material screen 190 or 190', which is the first example of the anisotropic fluorescent material screen, may be produced with a process illustrated in FIGS. 7A, 7B, 7C, and 7D in the manner described below.

Figure 7A:
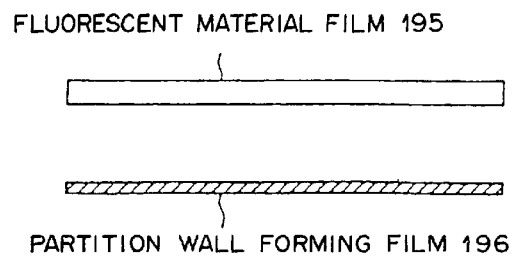
FIG. 7A is an explanatory view showing a fluorescent material film and a partition wall forming film, which are employed for forming a striped fluorescent material film in a process for producing the first example of the anisotropic fluorescent-material screen.

Firstly, fluorescent material particles and a binder are added into a solvent and mixed sufficiently to prepare a coating composition. The coating composition is applied onto a temporary substrate, such as a glass plate, a metal plate, or a plastic sheet, by use of a coating machine, and the applied coating composition is dried. In this manner, a plurality of fluorescent material films 195, 195, . . . , which are substantially constituted of the fluorescent material, are formed. One of the fluorescent material films 195, 195, . . . is shown in FIG. 7A. In order for the density of the fluorescent material to be enhanced even further, the obtained fluorescent material films 195, 195, . . . may be heated and compressed with calendering. Alternatively, instead of the binder being used, the fluorescent material films 195, 195, . . . may be formed on a substrate, such as a metal plate, by sintering or vapor phase deposition (vacuum evaporation).

Also, low-light absorptivity fine particles and a high-molecular weight substance are added into an organic solvent and mixed sufficiently to prepare a coating composition for forming partition walls. Alternatively, low-light absorptivity fine particles and a heat softening resin may be mixed and kneaded with heat to prepare a partition wall material composition. When necessary, in order for the amount of the produced fluorescence to be enhanced, a fluorescent material may be contained in the partition wall material composition. Alternatively, in order for enhanced image sharpness to be obtained, a fluorescence absorbing substance may be contained in the partition wall material composition. The coating composition for forming partition walls is applied and dried to obtain a plurality of thin partition wall forming films 196, 196, . . . . One of the partition wall forming films 196, 196, . . . is shown in FIG. 7A.

Figure 7B:
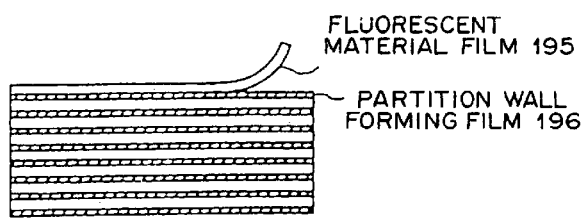
FIG. 7B is an explanatory view showing the step of forming a laminate from a plurality of fluorescent material films and a plurality of partition wall forming films.
Figure 7C:
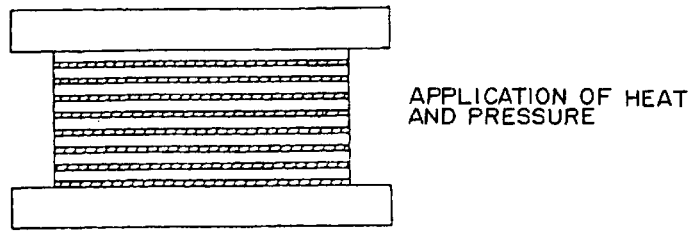
FIG. 7C is an explanatory view showing the step of forming a laminate block from the laminate shown in FIG. 7B.

Thereafter, as illustrated in FIG. 7B, a plurality of the fluorescent material films 195, 195, . . . and a plurality of the partition wall forming films 196, 196, . . . are alternately overlaid one upon another. Also, as illustrated in FIG. 7C, the fluorescent material films 195, 195, . . . and the partition wall forming films 196, 196, . . . having been overlaid one upon another are heated under pressure, and adjacent films are adhered one another to form a laminate block.

Figure 7D:
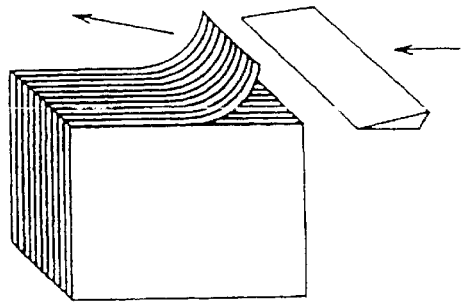
FIG. 7D is an explanatory view showing the step of slicing the laminate block of FIG. 7C to obtain a striped fluorescent material film, which has a striped structure along a plane direction.

Thereafter, as illustrated in FIG. 7D, the laminate block is sliced along the lamination plane. In this manner, a plurality of the striped fluorescent material films 191, 191, . . . are formed. As illustrated in FIG. 6A, each of the striped fluorescent material films 191, 191, . . . comprises the fluorescent material-filled regions 193, 193, . . . , which are constituted of fine pieces of the fluorescent material films 195, 195, . . . , and the partition walls 192, 192, . . . , which are constituted of fine pieces of the partition wall forming films 196, 196, . . . . In each of the striped fluorescent material films 191, 191, . . . , the fluorescent material-filled regions 193, 193, . . . and the partition walls 192, 192, . . . are arrayed alternately.

Thereafter, as illustrated in FIG. 6B or 6C, the plurality of the striped fluorescent material films 191, 191, . . . having thus been obtained are overlaid one upon another, such that the stripes in each of the striped fluorescent material films 191, 191, . . . intersect at an angle of 90° or 60° with the stripes in the adjacent striped fluorescent material film 191. Heat and pressure are then applied to the striped fluorescent material films 191, 191, . . . having thus been overlaid one upon another. At this time, the positions of the striped fluorescent material films 191, 191, . . . are adjusted such that the partition walls 192, 192, . . . of every third striped fluorescent material film 191 or every fourth striped fluorescent material film 191, whose stripe direction coincides with the stripe direction of every first striped fluorescent material film 191, overlap with the partition walls 192, 192, . . . of every first striped fluorescent material film 191, and such that the fluorescent material-filled regions 193, 193, . . . of every third striped fluorescent material film 191 or every fourth striped fluorescent material film 191, whose stripe direction coincides with the stripe direction of every first striped fluorescent material film 191, overlap with the fluorescent material-filled regions 193, 193, . . . of every first striped fluorescent material film 191.

An anisotropic fluorescent material screen 290, which is the second example of the anisotropic fluorescent material screen, will be described hereinbelow. The anisotropic fluorescent material screen 290 is produced with a first production process proposed by the applicant in Japanese Patent Application No. 2000-132355.

FIG. 8A is an explanatory front view showing a blade 182 utilized in the process for producing the second example of the anisotropic fluorescent material screen. As illustrated in FIG. 8A, the end of the blade 182 has a shape such that the thickness becomes thin toward the end. Alternatively, the entire blade may have the same thickness. Thus the blade may have an arbitrary shape. Also, the shape of the entire blade may be such that the end is pointed as in the cases of cutters. Alternatively, the shape of the entire blade may be a disk-like shape. Thus the shape of the entire blade may be selected from various arbitrary shapes.

FIG. 8B is an explanatory front view showing connected blades composed of a plurality of blades 182, 182, . . . having the structure shown in FIG. 8A. As illustrated in FIG. 8B, by way of example, connected blades 183, such as a slitter, are formed by arraying a plurality of the blades 182, 182, . . . at intervals identical with the intervals of grooves 197, 197, . . . and securing the blades 182, 182, . . . .

FIG. 8C is a schematic sectional view showing the step of simultaneously forming a plurality of the grooves 197, 197, . . . in a long fluorescent material film 195 by use of the connected blades 183 shown in FIG. 8B. In FIG. 8C, reference numeral 184 represents a roller.

By way of example, the anisotropic fluorescent material screen 290, which is the second example of the anisotropic fluorescent material screen, may be produced with a process illustrated in FIGS. 8A, 8B, 8C and FIGS. 9A to 9F in the manner described below.

Firstly, in the same manner as that in the first example, the fluorescent material film 195, which is substantially constituted of a fluorescent material, is formed. Thereafter, as illustrated in FIG. 8C, the long fluorescent material film 195 located on a temporary substrate is conveyed by rollers 184, 184, and the connected blades 183 having the structure shown in FIG. 8B are pushed against the long fluorescent material film 195 from above. In this manner, the grooves 197, 197, . . . are formed in the fluorescent material film 195.

Figures 9A, 9B:
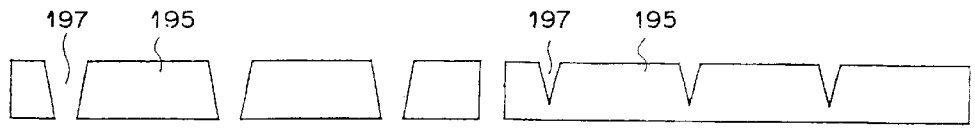
FIGS. 9A and 9B are partial schematic sectional views showing examples of grooved fluorescent material films.

FIG. 9A and 9B are partial schematic sectional views showing examples of the fluorescent material films 195, 195 having been provided with a plurality of grooves 197, 197, . . . . As illustrated in FIG. 9A, the grooves 197, 197, . . . may pierce through the fluorescent material film 195. Alternatively, as illustrated in FIG. 9B, the grooves 197, 197, . . . may be terminated midway of the thickness of the fluorescent material film 195. The depth of each of the grooves 197, 197, . . . should preferably fall within the range of 1/3 to 1/1 of the thickness of the fluorescent material film 195. Also, the width (the width of the top region) of each of the grooves 197, 197, . . . should fall within the range of 2 $\mu$m to 100 $\mu$m, depending upon the thickness of the partition walls required for image quality to be obtained, and should preferably fall within the range of 5 $\mu$m to 60 $\mu$m. The interval between adjacent grooves 197, 197 (the interval between the top regions of the adjacent grooves 197, 197) may fall within the range of 20 $\mu$m to 500 $\mu$m.

Also, as in the first example described above, a partition wall material composition is prepared. By way of example, the partition wall material composition is applied onto the surface of the fluorescent material film 195 on the side from which the grooves 197, 197, . . . were formed. In this manner, the grooves 197, 197, . . . are filled with the partition wall material composition. In cases where an organic solvent is contained in the partition wall material composition, the partition wall material composition filled in the grooves 197, 197, . . . is then dried and solidified. In cases where a heat softening resin is contained in the partition wall material composition, the partition wall material composition filled in the grooves 197, 197, . . . is then cooled and solidified. In this operation procedure, such that the partition wall material composition may not remain on the film surface regions other than the regions of the grooves 197, 197, . . . , the surplus partition wall material composition may be scraped off from the film surface by using a doctor blade, or the like, after the partition wall material composition has been applied.

Alternatively, before the grooves 197, 197, . . . are formed, the partition wall material composition may be applied onto the film surface. Before the applied partition wall material composition solidifies, the connected blades 183 may be pushed against the film surface to form the grooves 197, 197, . . . and to fill the grooves 197, 197, . . . with the partition wall material composition. In such cases, when the grooves 197, 197, . . . are formed by the connected blades 183, the partition wall material composition is simultaneously introduced into the grooves 197, 197, . . . . With this operation procedure, grooving is performed in the presence of the partition wall material composition. Therefore, only the partition wall material composition enters into the grooves 197, 197, . . . , which are formed by the connected blades 183. (With an ordinary technique, air will also enter into the grooves 197, 197, . . . ) Therefore, the filling rate of the partition wall material composition in the grooves 197, 197, . . . can be enhanced. The operation procedure described above is efficient particularly when the width of each of the grooves. 197, 197, . . . is narrow.

Figures 9C, 9D:
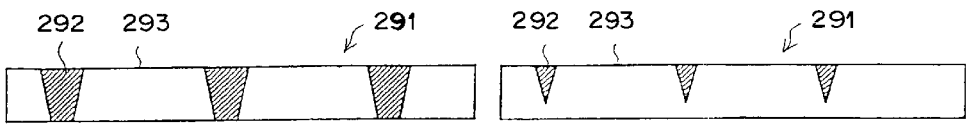
FIGS. 9C and 9D are partial schematic sectional views showing examples of striped fluorescent material films, in which a plurality of grooves have been filled with a partition wall material.
Figure 9E:
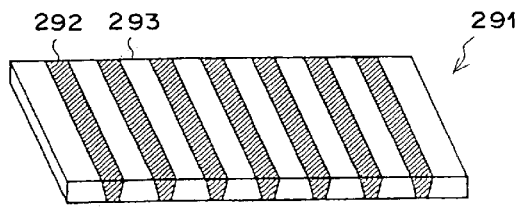
FIG. 9E is a schematic perspective view showing the striped fluorescent material film of FIG. 9C.

FIG. 9C and 9D are partial schematic sectional views showing examples of striped fluorescent material films 291, 291, in which a plurality of the grooves 197, 197, . . . have been filled with the partition wall material. FIG. 9E is a schematic perspective view showing the striped fluorescent material film 291 of FIG. 9C. In FIGS. 9C, 9D, and 9E, hatched regions represent partition walls 292, 292, . . . , which have been formed from the solidified partition wall material composition, and unhatched regions represent fluorescent material-filled regions 293, 293, . . . .

The long fluorescent material film 195, which has been obtained in the manner described above, is cut into a desired size. In this manner, a plurality of striped fluorescent material films 291, 291, . . . can be obtained. Each of the striped fluorescent material films 291, 291, . . . has the structure, in which the fluorescent material-filled regions 293, 293, . . . and the partition walls 292, 292, . . . are arrayed alternately so as to stand side by side in one-dimensional direction. Specifically, each striped fluorescent material film 291 has the partition walls 292, 292, . . . of the one-dimensional structure.

With the process described above, in which either one of the operation procedures is employed, the formation of the fluorescent material film 195, the grooving, and the filling of the grooves with the partition wall material composition can be performed continuously.

Figure 9F:
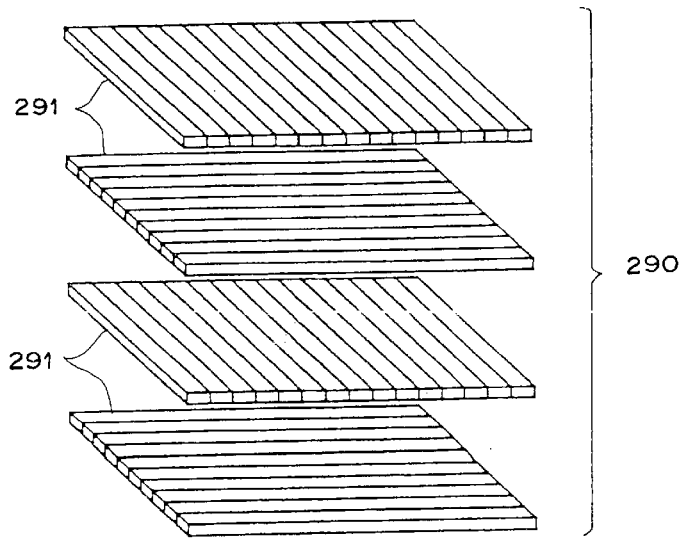
FIG. 9F is a schematic perspective view showing the step of overlaying a plurality of striped fluorescent material films one upon another, such that stripes of each of the striped fluorescent material films intersect perpendicularly to the stripes of an adjacent striped fluorescent material film.

Thereafter, a plurality of the striped fluorescent material films 291, 291, . . . having thus been obtained are separated from the temporary substrate. As in the first example described above, two to 100 striped fluorescent material films 291, 291, . . . are overlaid one upon another such that the stripes in adjacent striped fluorescent material films 291, 291 intersect each other. Heat and a pressure are then applied to the striped fluorescent material films 291, 291, . . . having thus been overlaid. In this manner, an anisotropic fluorescent material screen 290 having a partition wall structure, in which the stripes intersect one another with respect to the thickness direction of the anisotropic fluorescent material screen 290, is formed. The thickness of each of the striped fluorescent material films 291,291, . . . , the order in which the striped fluorescent material films 291, 291, . . . are overlaid, and the relationship among the stripe directions in the striped fluorescent material films 291, 291, . . . may be set in the same manner as that in the first example described above. By way of example, FIG. 9F schematically shows the step of overlaying four striped fluorescent material films 291, 291, . . . one upon another, such that the stripes of each of the striped fluorescent material films 291, 291, . . . intersect perpendicularly to the stripes of an adjacent striped fluorescent material film 291.

With the process described above, the anisotropic fluorescent material screen 290 can be produced with three or four steps, i.e. the step of forming the fluorescent material film, the step of grooving, the step of filling the grooves with the composition containing the partition wall material (which step may be performed simultaneously with the grooving step), and the step of overlaying the striped fluorescent material films one upon another.

An anisotropic fluorescent material screen, which is the third example of the anisotropic fluorescent material screen, will be described hereinbelow. The anisotropic fluorescent material screen is produced with a second production process proposed by the applicant in Japanese Patent Application No. 2000-132355.

In the process for producing the anisotropic fluorescent material screen, which is the third example of the anisotropic fluorescent material screen, firstly, the long fluorescent material film 195 is formed on the temporary substrate in the same manner as that in the second example described above.

Thereafter, in this operation procedure, in the same manner as that in the second example described above, the plurality of the grooves 197, 197, . . . are formed at a predetermined intervals in the fluorescent material film 195, and the partition wall material composition is filled in the grooves 197, 197, . . . . Further, the partition wall material composition is also applied onto the surface of the fluorescent material film 195 and solidified. In this manner, a partition wall layer 398 is formed on the fluorescent material film 195.

The partition wall layer 398 may be formed in the manner described below. Specifically, for example, when the partition wall material composition is applied onto the film surface, in which the grooves 197, 197, . . . have been formed, a sufficient amount of the partition wall material composition is applied onto the film surface. Also, the partition wall material composition having thus been applied is not scraped off. In this manner, the filling of the grooves 197, 197, . . . with the partition wall material composition and the application of the partition wall material composition onto the film surface can be simultaneously performed easily. The thickness of the partition wall layer 398 may fall within the range of 2 $\mu$m to 100 $\mu$m, and should preferably fall within the range of 5 $\mu$m to 60 $\mu$m.

Alternatively, before the grooves 197, 197, . . . are formed, a sufficient amount of the partition wall material composition may be applied onto the film surface. In this operation procedure, before the partition wall material composition having been applied solidifies, the connected blades 183 are pushed against the film surface to form the grooves 197, 197, . . . . In this manner, the grooving and the filling of the grooves 197, 197, . . . with the partition wall material composition may be performed simultaneously.

With the process described above, in which either one of the operation procedures is employed, the formation of the fluorescent material film 195, the grooving, the filling of the grooves with the partition wall material composition, and the formation of the partition wall layer 398 can be performed continuously.

The long fluorescent material film 195, which has been obtained in the manner described above, is cut into a desired size. In this manner, a plurality of striped fluorescent material films 391, 391, . . . can be obtained. Each of the striped fluorescent material films 391, 391, . . . has the structure, in which fluorescent material-filled regions 393, 393, . . . and the partition walls 392, 392, . . . are arrayed alternately so as to stand side by side in one-dimensional direction. Specifically, each striped fluorescent material film 391 has the partition walls 392, 392, . . . of the one-dimensional structure. Also, each of the striped fluorescent material films 391, 391, . . . has the partition wall layer 398 formed on one surface.

Figure 10A:
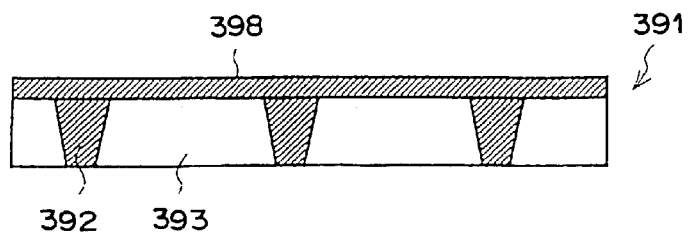
FIG. 10A is a partial schematic sectional view showing an example of a striped fluorescent material film, which is employed in the third example of the anisotropic fluorescent material screen.

FIG. 10A is a partial schematic sectional view showing one of the striped fluorescent material films 391, 391, . . . . As illustrated in FIG. 10A, each of the striped fluorescent material films 391, 391, . . . is constituted of the partition walls 392, 392, . . . , the fluorescent material-filled regions 393, 393, . . . , and the partition wall layer 398.

Figure 10B:
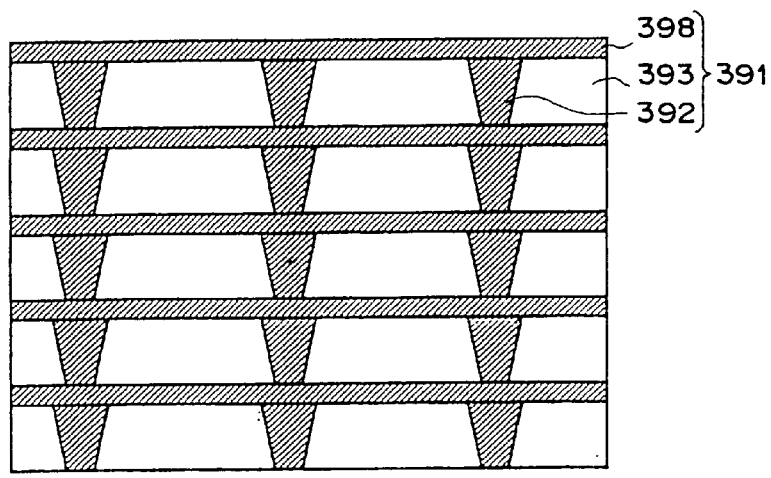
FIG. 10B is a partial schematic sectional view showing an example of a laminate block constituted of a plurality of striped fluorescent material films having the structure shown in FIG. 10A.

Thereafter, a plurality of the striped fluorescent material films 391, 391, . . . having thus been obtained are separated from the temporary substrate. The striped fluorescent material films 391, 391, . . . are then overlaid one upon another such that the partition wall layer 398 of each striped fluorescent material film 391 stands facing up, and such that the stripes in adjacent striped fluorescent material films 391, 391 are parallel with each other, i.e. such that the stripe directions in the adjacent striped fluorescent material films 391, 391 coincide with each other. Heat and a pressure are then applied to the striped fluorescent material films 391, 391, . . . having thus been overlaid. In this manner, a laminate block is formed. By way of example, FIG. 10B schematically shows part of the laminate block constituted of five striped fluorescent material films 391, 391, . . . .

Thereafter, the laminate block is sliced along the lamination plane, in which the stripes appear. In this manner, an anisotropic fluorescent material screen provided with the partition walls of the two-dimensional structure can be obtained. (The top plan view of the anisotropic fluorescent material screen is the same as FIG. 10B.) The thickness of the anisotropic fluorescent material screen should preferably fall within the range of 50 μm to 1,500 μm.

With the process described above, the anisotropic fluorescent material screen can be produced with four or five steps, i.e. the step of forming the fluorescent material film, the step of grooving, the step of filling the grooves with the composition containing the partition wall material (which step may be performed simultaneously with the grooving step), the step of overlaying the striped fluorescent material films one upon another, and the step of slicing the laminate block.

The first, second, and third examples of the anisotropic fluorescent material screens described above need not necessarily be provided with a substrate and a protective film. However, such that the conveyance and processing of the anisotropic fluorescent material screens may be performed easily or such that a change in characteristics of the anisotropic fluorescent material screens may be avoided, the first, second, and third examples of the anisotropic fluorescent material screens may be provided with a substrate and/or a protective film. Also, such that the sensitivity may be enhanced, a light reflecting layer may be formed on one side of the anisotropic fluorescent material screen (or between the anisotropic fluorescent material screen and the substrate in cases where the substrate is provided).

The two-dimensional image read-out means, which is employed in the image recording and read-out apparatus in accordance with the present invention, is not limited to the solid-state radiation detector 10 described above and may be one of various other means constituted such that the latent image charges carrying image information can be read with stripe-shaped electrodes. Also, the two-dimensional image read-out means is not limited to the means, in which an image signal is acquired through scanning with reading light. For example, the two-dimensional image read-out means may be the means, in which an image signal is acquired through switch change-over. Such means is described in, for example, U.S. Pat. No. 5,268,569, and Japanese Patent Application Nos. 11(1999)-87922 and 11(1999)-87923.

Also, in the radiation image recording and read-out apparatuses 1 and 2 described above, the electrode of the second electrical conductor layer 15 is constituted of the striped electrode 16. Alternatively, the electrode of the second electrical conductor layer 15 may be formed as a flat plate-like electrode and may be scanned with spot-like reading light, such as a laser beam, for reading the latent image charges. In such cases, the spatial frequency fS of the sampling pitch, at which the latent image charges are read with scanning with the reading light, may be set to be at least two times as high as the spatial frequency fG of the array pitch of the partition wall members 90a, 90a, . . . . In this manner, a moire phenomenon can be prevented from occurring. Also, the difference between the spatial frequency fS of the sampling pitch and the spatial frequency fG of the array pitch of the partition wall members 90a, 90a, . . . , the difference representing the moire frequency, may be set to be at least 1 cycle/mm. In this manner, the number of perceptible streaks periodically occurring in the image due to the moire phenomenon can be decreased, and the moire can be rendered visually imperceptible. The spatial frequency fS of the sampling pitch may be of either one or both of the main scanning direction and the sub-scanning direction.

Further, in the embodiments described above, the improved direct conversion type of solid-state radiation detector is employed as the two-dimensional image read-out means. Alternatively, any of other types of means, in which the anisotropic fluorescent material screen is utilized as the fluorescent material screen, may be employed as the two-dimensional image read-out means. The two-dimensional image read-out means and the anisotropic fluorescent material screen may be combined into an integral body or may be formed as two independent means.

For example, in cases where a direct conversion type of solid-state radiation detector is employed as the two-dimensional image read-out means, a plurality of charge collecting electrodes, each of which corresponds to one pixel, may be arrayed at a predetermined pitch PD (mm) in a matrix-like form in X and Y directions, which are normal to each other, on an insulating substrate. Also, the partition wall members of the anisotropic fluorescent material screen may be arrayed at an array pitch PG (mm) in at least either one of the X and Y directions. The X direction corresponds to one of the main scanning direction and the sub-scanning direction, and the Y direction corresponds to the other scanning direction.

In cases where a photo conversion type of solid-state radiation detector is employed as the two-dimensional image read-out means, the charge collecting electrodes in the direct conversion type of solid-state radiation detector are replaced by photoelectric conversion devices, and a plurality of the photoelectric conversion devices may be arrayed at a predetermined pitch PP (mm) in a matrix-like form in the X and Y directions on an insulating substrate. Also, the partition wall members of the anisotropic fluorescent material screen may be arrayed at an array pitch PG (mm) in at least either one of the X and Y directions.

A spatial frequency fD of the array pitch of the charge collecting electrodes in the array direction of the partition wall members, which spatial frequency corresponds to the spatial frequency of the readout and is represented by the formula of fD=1/PD (cycle/mm), or a spatial frequency fP of the array pitch of the photoelectric conversion devices in the array direction of the partition wall members, which spatial frequency corresponds to the spatial frequency of the read-out and is represented by the formula of fP=1/PP (cycle/mm), may be set at a value at least two times as high as the spatial frequency fG of the array pitch of the partition wall members, which spatial frequency is represented by the formula of fG=1/PG (cycle/mm). In such cases, as in the aforesaid image recording and read-out apparatuses 1 and 2 utilizing the improved direct conversion type of solid-state radiation detector, the moire phenomenon causing a perceptible periodical streak-like pattern to occur in the image does not occur theoretically.

In cases where it cannot be set such that the spatial frequency fG of the array pitch of the partition wall members satisfies the relationship described above, it may be set such that the difference between the spatial frequency fD, which is represented by the formula of fD=1/PD (cycle/mm), or the spatial frequency fP, which is represented by the formula of fP=1/PP (cycle/mm), and the spatial frequency fG of the array pitch of the partition wall members, which is represented by the formula of fG=1/PG (cycle/mm), the difference representing the moire frequency, is at least 1 cycle/mm. In such cases, the number of perceptible vertical streaks or perceptible horizontal streaks appearing periodically on the image can be reduced, and therefore the moire can be rendered visually imperceptible.

As described above with reference to FIGS. 3A, 3B, 3C, and 3D, the image recording and read-out apparatus may be provided with the image processing means for suppressing the signal components, which is contained in the image signal having been obtained from the direct conversion type or the photo conversion type of solid-state radiation detector and which carry the spatial frequency of the direction of anisotropy of the anisotropic fluorescent material screen, or for suppressing the signal components, which is contained in the image signal having been obtained from the direct conversion type or the photo conversion type of solid-state radiation detector and which carry the moire frequency occurring due to the anisotropic fluorescent material screen. In this manner, the streak-like pattern representing the partition wall members or occurring periodically due to the moire can be rendered visually imperceptible in the image.

In the embodiments described above, the solid-state radiation detector is employed as the two-dimensional image read-out means, and the electric signal proportional to the amount of the latent image charges, which are accumulated at the charge accumulating section and carry the radiation image information, is detected. However, the two-dimensional image read-out means employed in the image recording and read-out method and the image recording and read-out apparatus in accordance with the present invention is not limited to the irradiation of the radiation and may be constituted such that an image signal is detected through irradiation of ordinary light (not limited to visible light).

An embodiment, wherein the anisotropic fluorescent material screen, in which the direction of anisotropy is the one-dimensional direction alone, is employed, and the sharpness of the image signal, which has been detected with the two-dimensional image read-out means, with respect to the main scanning direction and the sharpness of the image signal with respect to the sub-scanning direction are balanced, will be described hereinbelow.

In cases where the anisotropic fluorescent material screen 90, which comprises the partition wall members 90a, 90a, . . . arrayed in the stripe-like form and in which the direction of anisotropy is the one-dimensional direction alone, is utilized as shown in FIG. 1 or FIG. 4, with respect to the array direction of the partition wall members 90a, 90a, . . . , the fluorescence does not spread beyond the array pitch PG of the partition wall members 90a, 90a, . . . . Accordingly, deterioration in sharpness with respect to the array direction of the partition wall members 90a, 90a, . . . , along which the partition wall members 90a, 90a, . . . stand side by side, can be reduced. However, with respect to the direction, which is normal to the array direction of the partition wall members 90a, 90a, . . . , i.e. with respect to the longitudinal direction of each of the partition wall members 90a, 90a, . . . , the fluorescence spreads freely. Therefore, with respect to the direction, which is normal to the array direction of the partition wall members 90a, 90a, . . . , the effects of preventing the sharpness from becoming low cannot be obtained, and blurring occurs. Therefore, if the image recording operation is performed by locating the anisotropic fluorescent material screen such that the direction of anisotropy coincides with the main scanning direction or the sub-scanning direction in the two-dimensional image read-out means, the sharpness with respect to the main scanning direction and the sharpness with respect to the sub-scanning direction will become different from each other and will become unbalanced.

In such cases, as illustrated in FIG. 11A, the image recording and read-out apparatus may be provided with sharpness balancing means 80 for operating such that the sharpness of an image signal, which has been detected with the solid-state radiation detector 10, with respect to the main scanning direction and sharpness of the image signal with respect to the sub-scanning direction are set to be approximately identical with each other. In such cases, the sharpness balancing means 80 should preferably be combined with the image processing means 70 shown in FIG. 3A.

As illustrated in FIG. 11B, the sharpness balancing means 80 may perform predetermined signal processing on the image signal such that a low sharpness with respect to the direction X is enhanced so as to become identical with a high sharpness with respect to the direction Y. Alternatively, as illustrated in FIG. 11C, the sharpness balancing means 80 may perform predetermined signal processing on the image signal such that the high sharpness with respect to the direction Y is suppressed so as to become identical with the low sharpness with respect to the direction X. As the image processing technique for enhancing the sharpness and suppressing the sharpness, one of various techniques may be employed.

In addition, all of the contents of Japanese Patent Application Nos. 11(1999)-242874 and 2000-251313 are incorporated into this specification by reference.

What is claimed is:

1. An image recording and read-out method, comprising the steps of:
    i) locating an electromagnetic wave source, which produces a recording electromagnetic wave, on one side of an object,
    ii) locating two-dimensional image read-out means on the other side of the object, the two-dimensional image read-out means comprising a charge accumulating section for accumulating latent image charges, which carry image information, and
    iii) performing an operation for recording and reading out an image of the object,
        wherein an anisotropic fluorescent material screen is located between the object and the two-dimensional image read-out means, and
        the operation for recording and reading out the image of the object is performed in this state.

2. A method as defined in claim 1 wherein the two-dimensional image read-out means comprises a plurality of linear electrodes for acquiring an electric signal proportional to an amount of the latent image charges, the linear electrodes being arrayed so as to stand side by side in a stripe-like form,
    the anisotropic fluorescent material screen is a fluorescent material screen, in which a direction of anisotropy is a one-dimensional direction alone, and
    the anisotropic fluorescent material screen is located such that the direction of anisotropy is approximately normal to an array direction of the linear electrodes, along which the linear electrodes stand side by side.

3. A method as defined in claim 1 wherein a difference between a spatial frequency of a read-out pitch of an image signal detected with the two-dimensional image read-out means and a spatial frequency of an anisotropy pitch of the anisotropic fluorescent material screen is set at a value of at least 1 cycle/mm.

4. A method as defined in claim 3 wherein signal components, which are contained in the image signal having been detected with the two-dimensional image read-out means and which carry a moire frequency occurring due to the anisotropic fluorescent material screen, are suppressed.

5. A method as defined in claim 1 wherein a spatial frequency of a read-out pitch of an image signal detected with the two-dimensional image read-out means is set at a value at least two times as high as a spatial frequency of an anisotropy pitch of the anisotropic fluorescent material screen.

6. A method as defined in claim 5 wherein signal components, which are contained in the image signal having been detected with the two-dimensional image read-out means and which carry the spatial frequency of the anisotropy pitch of the anisotropic fluorescent material screen, are suppressed.

7. A method as defined in claim 1, 2, 3, 4, 5, or 6 wherein an anisotropic fluorescent material screen, in which a direction of anisotropy is a one-dimensional direction alone, is utilized as the anisotropic fluorescent material screen, the anisotropic fluorescent material screen is located such that the direction of anisotropy coincides with a main scanning direction or a sub-scanning direction in the two-dimensional image read-out means, and sharpness of an image signal, which has been detected with the two-dimensional image read-out means, with respect to the main scanning direction and sharpness of the image signal with respect to the sub-scanning direction are set to be approximately identical with each other.

8. A method as defined in claim 1, 3, 4, 5, or 6 wherein the anisotropic fluorescent material screen comprises at least two striped fluorescent material layers, each of which is constituted of stripe-like partition walls for partitioning the anisotropic fluorescent material screen in a one-dimensional direction along a plane direction, and fluorescent material-filled regions partitioned by the stripe-like partition walls, the at least two striped fluorescent material layers being overlaid one upon the other such that the stripe-like partition walls of each of the striped fluorescent material layers intersect at an angle of approximately 90° or approximately 60° with the stripe-like partition walls of an adjacent striped fluorescent material layer.

9. A method as defined in claim 1, 3, 4, 5, or 6 wherein the anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) solidifying the composition to obtain a striped fluorescent material film, which has partition walls arrayed so as to stand side by side in a one-dimensional direction, and e) overlaying a plurality of striped fluorescent material films, which have thus been obtained, such that the stripes of each of the striped fluorescent material films intersect with the stripes of an adjacent striped fluorescent material film.

10. A method as defined in claim 1, 3, 4, 5, or 6 wherein the anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) applying the composition, which contains the a partition wall material dispersed therein, onto a surface of the fluorescent material film, e) solidifying the composition to obtain a striped fluorescent material film, which has partition walls arrayed so as to stand side by side in a one-dimensional direction and has a partition wall layer formed on one surface, f) overlaying a plurality of striped fluorescent material films, which have thus been obtained, such that the stripes of each of the striped fluorescent material films are parallel with the stripes of an adjacent striped fluorescent material film, to obtain a laminate block, and g) slicing the laminate block along a lamination plane, in which the stripes appear.

11. An image recording and read-out apparatus, comprising two-dimensional image read-out means for receiving an incident recording electromagnetic wave and accumulating latent image charges, which carry image information, at a charge accumulating section, wherein the improvement comprises the provision of an anisotropic fluorescent material screen, which is located between an object and the two-dimensional image read-out means.

12. An apparatus as defined in claim 11 wherein the two-dimensional image read-out means is a photo reading type of two-dimensional image read-out means operating such that, when the photo reading type of two-dimensional image read-out means is exposed to a reading electromagnetic wave, the photo reading type of two-dimensional image read-out means outputs an image signal of a level proportional to the amount of the latent image charges accumulated at the charge accumulating section.

13. An apparatus as defined in claim 11 or 12 wherein the two-dimensional image read-out means comprises a plurality of linear electrodes for acquiring an electric signal proportional to an amount of the latent image charges, the linear electrodes being arrayed so as to stand side by side in a stripe-like form, the anisotropic fluorescent material screen is a fluorescent material screen, in which a direction of anisotropy is a one-dimensional direction alone, and the anisotropic fluorescent material screen is located such that the direction of anisotropy is approximately normal to an array direction of the linear electrodes, along which the linear electrodes stand side by side.

14. An apparatus as defined in claim 11 or 12 further comprising moire component reducing means for reducing moire components, which may be contained in an image signal detected with the two-dimensional image read-out means and which occur due to the anisotropic fluorescent material screen.

15. An apparatus as defined in claim 14 wherein the moire component reducing means is means for operating such that a difference between a spatial frequency of a read-out pitch of the image signal detected with the two-dimensional image read-out means and a spatial frequency of an anisotropy pitch of the anisotropic fluorescent material screen is set at a value of at least 1 cycle/mm.

16. An apparatus as defined in claim 15 wherein the moire component reducing means is provided with first image processing means for suppressing signal components, which are contained in the image signal having been detected with the two-dimensional image read-out means and which carry a moire frequency occurring due to the anisotropic fluorescent material screen.

17. An apparatus as defined in claim 14 wherein the moire component reducing means is means for operating such that a spatial frequency of a read-out pitch of the image signal detected with the two-dimensional image read-out means is set at a value at least two times as high as a spatial frequency of an anisotropy pitch of the anisotropic fluorescent material screen.

18. An apparatus as defined in claim 17 wherein the moire component reducing means is provided with second image processing means for suppressing signal components, which are contained in the image signal having been detected with the two-dimensional image read-out means and which carry the spatial frequency of the anisotropy pitch of the anisotropic fluorescent material screen.

19. An apparatus as defined in claim 11 or 12 wherein the anisotropic fluorescent material screen is a fluorescent material screen, in which a direction of anisotropy is a one-dimensional direction alone, the anisotropic fluorescent material screen is located such that the direction of anisotropy coincides with a main scanning direction or a sub-scanning direction in the two-dimensional image read-out means, and the apparatus further comprises sharpness balancing means for operating such that sharpness of an image signal, which has been detected with the two-dimensional image read-out means, with respect to the main scanning direction and sharpness of the image signal with respect to the sub-scanning direction are set to be approximately identical with each other.

20. An apparatus as defined in claim 11 or 12 wherein the anisotropic fluorescent material screen comprises at least two striped fluorescent material layers, each of which is constituted of stripe-like partition walls for partitioning the anisotropic fluorescent material screen in a one-dimensional direction along a plane direction, and fluorescent material-filled regions partitioned by the stripe-like partition walls, the at least two striped fluorescent material layers being overlaid one upon the other such that the stripe-like partition walls of each of the striped fluorescent material layers intersect at an angle of approximately 90° or approximately 60° with the stripe-like partition walls of an adjacent striped fluorescent material layer.

21. An apparatus as defined in claim 11 or 12 wherein the anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) solidifying the composition to obtain a striped fluorescent material film, which has partition walls arrayed so as to stand side by side in a one-dimensional direction, and e) overlaying a plurality of striped fluorescent material films, which have thus been obtained, such that the stripes of each of the striped fluorescent material films intersect with the stripes of an adjacent striped fluorescent material film.

22. An apparatus as defined in claim 11 or 12 wherein the anisotropic fluorescent material screen is produced by a production process comprising the steps of:

a) forming a fluorescent material film, which is substantially constituted of a fluorescent material, b) forming a plurality of grooves, each of which has a predetermined width, at predetermined intervals in the fluorescent material film, c) filling each of the grooves with a composition, which contains a partition wall material dispersed therein, d) applying the composition, which contains the a partition wall material dispersed therein, onto a surface of the fluorescent material film, e) solidifying the composition to.obtain a striped fluorescent material film, which has partition walls arrayed so as to stand side by side in a one-dimensional direction and has a partition wall layer formed on one surface, f) overlaying a plurality of striped fluorescent material films, which have thus been obtained, such that the stripes of each of the striped fluorescent material films are parallel with the stripes of an adjacent striped fluorescent material film, to obtain a laminate block, and g) slicing the laminate block along a lamination plane, in which the stripes appear.

* * * * *